United States Patent
Luedtke et al.

(10) Patent No.: US 11,728,928 B2
(45) Date of Patent: Aug. 15, 2023

(54) SECURELY SHARING PUBLIC AND PRIVATE BLOCKCHAIN DATA

(71) Applicant: SPLUNK INC., San Francisco, CA (US)

(72) Inventors: Stephen R. Luedtke, Denver, CO (US); Nathaniel G. McKervey, Tallahassee, FL (US); Ryan Moore, St. Augustine, FL (US); Siegfried Puchbauer, San Francisco, CA (US); Antoine Toulme, San Jose, CA (US)

(73) Assignee: SPLUNK INC., San Francisco, CA (US)

( * ) Notice: Subject to any disclaimer, the term of this patent is extended or adjusted under 35 U.S.C. 154(b) by 0 days.

(21) Appl. No.: 17/494,695

(22) Filed: Oct. 5, 2021

(65) Prior Publication Data

US 2023/0104626 A1   Apr. 6, 2023

(51) Int. Cl.
| | | |
|---|---|---|
| H04L 1/00 | (2006.01) | |
| H04L 9/08 | (2006.01) | |
| H04L 41/02 | (2022.01) | |
| H04L 67/1097 | (2022.01) | |
| H04L 41/22 | (2022.01) | |
| H04L 9/00 | (2022.01) | |

(52) U.S. Cl.
CPC .......... *H04L 1/0045* (2013.01); *H04L 1/0041* (2013.01); *H04L 9/085* (2013.01); *H04L 41/024* (2013.01); *H04L 41/22* (2013.01); *H04L 67/1097* (2013.01); *H04L 9/50* (2022.05); *H04L 2209/56* (2013.01)

(58) Field of Classification Search
CPC ... H04L 1/0041; H04L 1/0045; H04L 41/024; H04L 41/22; H04L 9/085; H04L 9/063; G06F 16/245; G06F 16/248
See application file for complete search history.

(56) References Cited

U.S. PATENT DOCUMENTS 10,554,637 B1 *   2/2020   Bendersky .............. H04L 9/085
11,522,714 B2 *  12/2022   Choi ..................... H04L 9/0643

OTHER PUBLICATIONS

Sun et al., Multi-keyword searchable and data verifiable attribute-based encryption scheme for cloud storage, IEEE Access, vol. 7, pp. 66655 to 66667. (Year: 2019).*
International Search Report for application No. PCT/US2022/077482 dated Dec. 22, 2022.
Anonymous, "hyperledger-fabricdocs Documentation—Release master", Retrieved from URL:https://hyperledger-fabric.readthedocs.io/_/downloads/en/v2.2.1/pdf/, Sep. 30, 2020, 601 pages.
Putz et al., "HyperSec: Visual Analytics for Blockchain Security Monitoring", In International Conference on Intelligent Information Processing, DOI:10.1007/978-3-030-78120-0_11, vol. 625, 2021, 14 pages.

* cited by examiner

*Primary Examiner* — Shelly A Chase
(74) *Attorney, Agent, or Firm* — Artegis Law Group, LLP

(57) ABSTRACT

A blockchain consortium network can be implemented in which nodes of one or more blockchains generate data for pipeline-based processing by a consortium pipeline system. The generated data can include private blockchain data, public blockchain data, and machine data, such as logs or operational metrics from the nodes. The data is collected from different network levels and can be transformed via pipeline processes of the consortium pipeline system to securely share data in the blockchain consortium network.

20 Claims, 19 Drawing Sheets

INDEX=CONSORTIUM_DATA_FULL_PIPELINE_MASKED_NODE_1

| LIST ▾ | / FORMAT   20 PER PAGE ▾ |
|---|---|
| TIME | EVENT |
| 6/26/21 3:45:33.000 PM | { [-]<br>BLOCKHASH: 0XEC3E5C0370BD356<br>BLOCKNUMBER: 6736543<br>CALL: { [-]<br>  ARGS: { [-]<br>  }<br>  NAME: SUBMITHASH<br>  PARAMS: [ [-]<br>    { [-]<br>    NAME: BATCHHASH<br>    TYPE: BYTES32<br>    VALUE: 0X EEA185987...<br>    }<br>  ]<br>  SIGNATURE: SUBMITHASH(BYTES32,BYTES32)<br>}<br>CONTRACTADDRESS: NULL<br>CUMULATIVEGASUSED: 24227<br>FROM: 0XAD1FB3F5265B5605BAA3C2FD3A2322 |

SECURELY SHARING PUBLIC AND PRIVATE BLOCKCHAIN DATA

TECHNICAL FIELD

The present disclosure generally relates to special-purpose machines that provide data management and improvements to such variants, and to the technologies by which such special-purpose machines become improved compared to other special-purpose machines for managing data using one or more blockchains.

BACKGROUND

Blockchains can be implemented to share data between nodes in an immutable and trustless approach. Due to the immutability and trust requirements, it can be difficult to securely share blockchain data from blockchain nodes without increasing the risk of exposing the data to malicious users.

BRIEF DESCRIPTION OF THE DRAWINGS

Various ones of the appended drawings merely illustrate example embodiments of the present disclosure and should not be considered as limiting its scope.

FIG. 16 shows a user interface of an intake and query system, according to some example embodiments.

DETAILED DESCRIPTION

The description that follows includes systems, methods, techniques, instruction sequences, and computing machine program products that embody illustrative embodiments of the disclosure. In the following description, for the purposes of explanation, numerous specific details are set forth in order to provide an understanding of various embodiments of the inventive subject matter. It will be evident, however, to those skilled in the art, that embodiments of the inventive subject matter may be practiced without these specific details. In general, well-known instruction instances, protocols, structures, and techniques are not necessarily shown in detail.

As discussed above, it can be difficult to securely share blockchain data between blockchain entities. To this end, a consortium blockchain system can be implemented to receive different types of data from participant blockchain consortium entities, and modify and route the blockchain data to different targets (e.g., data stores) without affecting the native operation of blockchain networks. For example, a plurality of blockchain nodes (e.g., blockchain peer applications) can be hosted on various computing devices e.g., different virtual clouds, on-premise computing devices) of the networked blockchain consortium entities. The machine data provided from the entities can include data from different computing network levels, such as host device information and client application data, and can further include blockchain data, such as private transaction data and public transaction data. In some example embodiments, one or more blockchain monitors are configured to collect the blockchain data. The blockchains can include a public blockchain (e.g., Bitcoin) and a private blockchain (e.g., Hyperledger), or a hybrid public and private blockchain (e.g., a fork of a public chain, such as a fork of Ethereum). The consortium blockchain system can split and process the collected data using different conditional criteria, such as which nodes are involved in a given transaction, whether the nodes are consortium participants or unknown networked nodes, and whether the data is encrypted or decrypted, as an example. The consortium system can output the modified data to targets, such as a consortium operator instance for management, or to one or more data stores, such as databases specified by the participating consortium entities, in accordance with some example embodiments.

Figure 1:
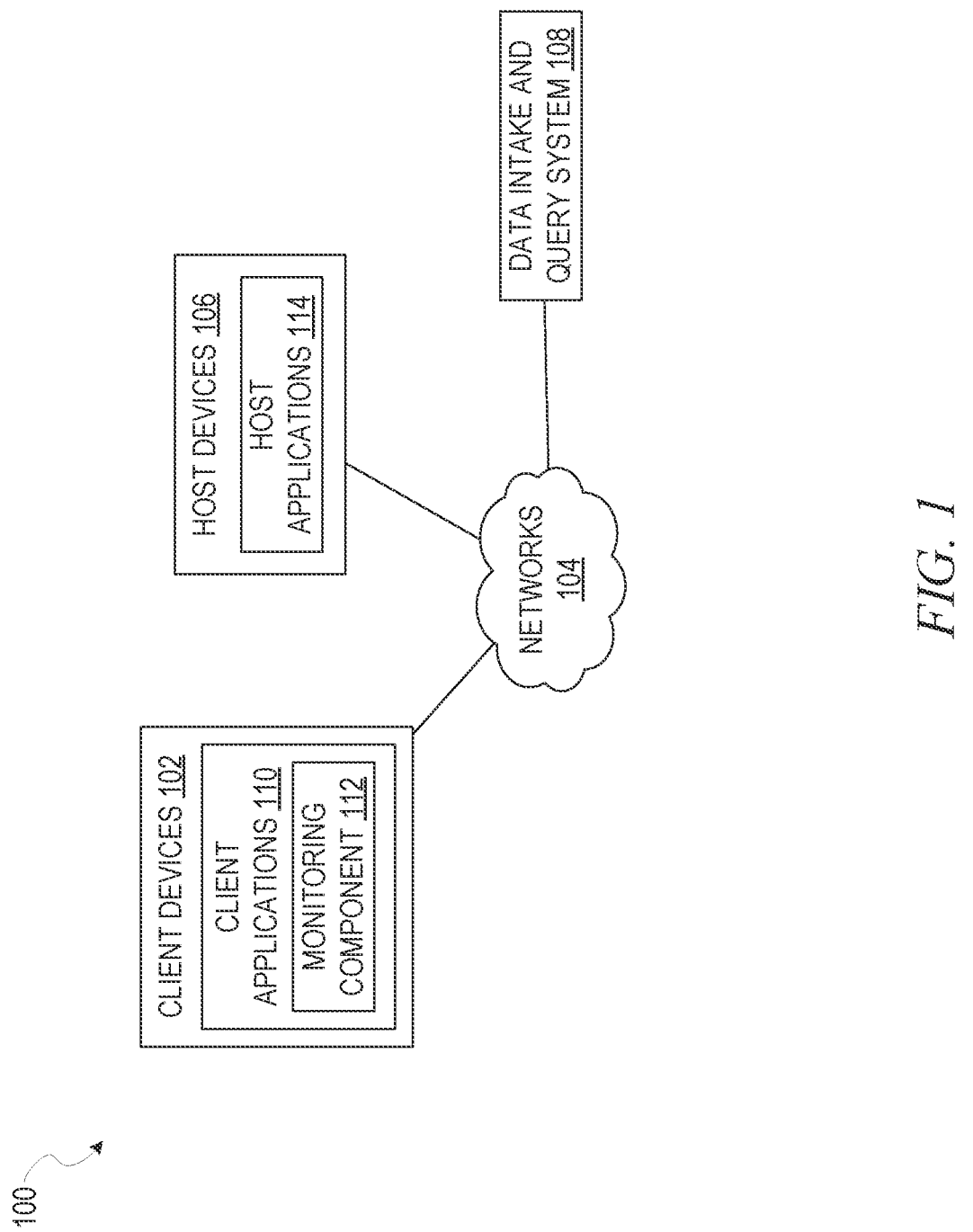
FIG. 1 is a block diagram of an example networked computer environment, according to some example embodiments.

FIG. 1 is a block diagram of an example networked computer environment 100, in accordance with example embodiments. It will be understood that FIG. 1 represents one example of a networked computer system and other embodiments may use different arrangements. The networked computer environment 100 comprises one or more computing devices. These one or more computing devices comprise any combination of hardware and software configured to implement the various logical components described herein. For example, the one or more computing devices may include one or more memories that store instructions for implementing the various components described herein, one or more hardware processors configured to execute the instructions stored in the one or more memories, and various data repositories in the one or more memories for storing data structures utilized and manipulated by the various components.

In some embodiments, one or more client devices 102 are coupled to one or more host devices 106 and a data intake and query system 108 via one or more networks 104. Networks 104 broadly represent one or more LANs, WANs, cellular networks (e.g., LTE, HSPA, 3G, and other cellular technologies), and/or networks using any of wired, wireless, terrestrial microwave, or satellite links, and may include the public Internet.

In the illustrated embodiment, the networked computer environment 100 includes one or more host devices 106. Host devices 106 may broadly include any number of computers, virtual machine instances, and/or data centers that are configured to host or execute one or more instances of host applications 114. In general, a host device 106 may be involved, directly or indirectly, in processing requests received from client devices 102. Each host device 106 may comprise, for example, one or more of a network device, a web server, an application server, a database server, etc. A collection of host devices 106 may be configured to implement a network-based service. For example, a provider of a network-based service may configure one or more host devices 106 and host applications 114 (e.g., one or more web servers, application servers, database servers) to collectively implement the network-based application.

In general, client devices 102 communicate with one or more host applications 114 to exchange information. The communication between a client device 102 and a host application 114 may, for example, be based on the Hypertext Transfer Protocol (HTTP) or any other network protocol. Content delivered from the host application 114 to a client device 102 may include, for example, HTML documents, media content, etc. The communication between a client device 102 and host application 114 may include sending various requests and receiving data packets. For example, in general, a client device 102 or application running on a client device may initiate communication with a host application 114 by making a request for a specific resource (e.g., based on an HTTP request), and the application server may respond with the requested content stored in one or more response packets.

In the illustrated embodiment, one or more of host applications 114 may generate various types of performance data during operation, including event logs, network data, sensor data, and other types of machine data. For example, a host application 114 comprising a web server may generate one or more web server logs in which details of interactions between the web server and any number of client devices 102 is recorded. As another example, a host device 106 comprising a router may generate one or more router logs that record information related to network traffic managed by the router. In some example embodiments, a host application 114 comprising a database server may generate one or more logs that record information related to requests sent from other host applications 114 (e.g., web servers or application servers) for data managed by the database server. Further, in some example embodiments, the host devices 106 comprise one or more hardware devices that generate data from one or more sensors (e.g., vehicles, home appliances).

Client devices 102 of FIG. 1 represent any computing device capable of interacting with one or more host devices 106 via a network 104. Examples of client devices 102 may include, without limitation, smart phones, tablet computers, handheld computers, wearable devices, laptop computers, desktop computers, servers, portable media players, gaming devices, and so forth. In general, a client device 102 can provide access to different content, for instance, content provided by one or more host devices 106, etc. Each client device 102 may comprise one or more client applications 110, described in more detail in a separate section hereinafter.

In some embodiments, each client device 102 may host or execute one or more client applications 110 that are capable of interacting with one or more host devices 106 via one or more networks 104. For instance, a client application 110 may be or comprise a web browser that a user may use to navigate to one or more websites or other resources provided by one or more host devices 106. As another example, a client application 110 may comprise a mobile application or "app." For example, an operator of a network-based service hosted by one or more host devices 106 may make available one or more mobile apps that enable users of client devices 102 to access various resources of the network-based service. As yet another example, client applications 110 may include background processes that perform various operations without direct interaction from a user. A client application 110 may include a "plug-in" or "extension" to another application, such as a web browser plug-in or extension.

In some embodiments, a client application 110 may include a monitoring component 112. At a high level, the monitoring component 112 comprises a software component or other logic that facilitates generating performance data related to a client device's operating state, including monitoring network traffic sent and received from the client device and collecting other device and/or application-specific information. Monitoring component 112 may be an integrated component of a client application 110, a plug-in, an extension, or any other type of add-on component. Monitoring component 112 may also be a stand-alone process.

In some embodiments, a monitoring component 112 may be created when a client application 110 is developed, for example, by an application developer using a software development kit (SDK). The SDK may include custom monitoring code that can be incorporated into the code implementing a client application 110. When the code is converted to an executable application, the custom code implementing the monitoring functionality can become part of the application itself. In some embodiments, an SDK or other code for implementing the monitoring functionality may be offered by a provider of a data intake and query system, such as a data intake and query system 108. In such cases, the provider of the data intake and query system 108 can implement the custom code so that performance data generated by the monitoring functionality is sent to the data intake and query system 108 to facilitate analysis of the performance data by a developer of the client application 110 or other users.

In some embodiments, network performance data refers to any type of data that indicates information about the network and/or network performance. Network performance data may include, for instance, a URL requested, a connection type (e.g., HTTP, HTTPS), a connection start time, a connection end time, an HTTP status code, request length, response length, request headers, response headers, connection status (e.g., completion, response time(s), failure), and the like. Upon obtaining network performance data indicating performance of the network, the network performance data can be transmitted to a data intake and query system 108 for analysis and validation (e.g., blockchain based integrity analysis).

The data intake and query system 108 can process and store machine data received from the data sources, such as the client devices 102 or host devices 106, and execute queries on the data in response to requests received from one or more computing devices (e.g., data integrity requests). In some cases, the data intake and query system 108 can generate events from the received data and store the events in buckets in a common storage system. In response to received queries, the data intake and query system 108 can assign one or more search nodes to search the buckets in the common storage.

Figure 2:
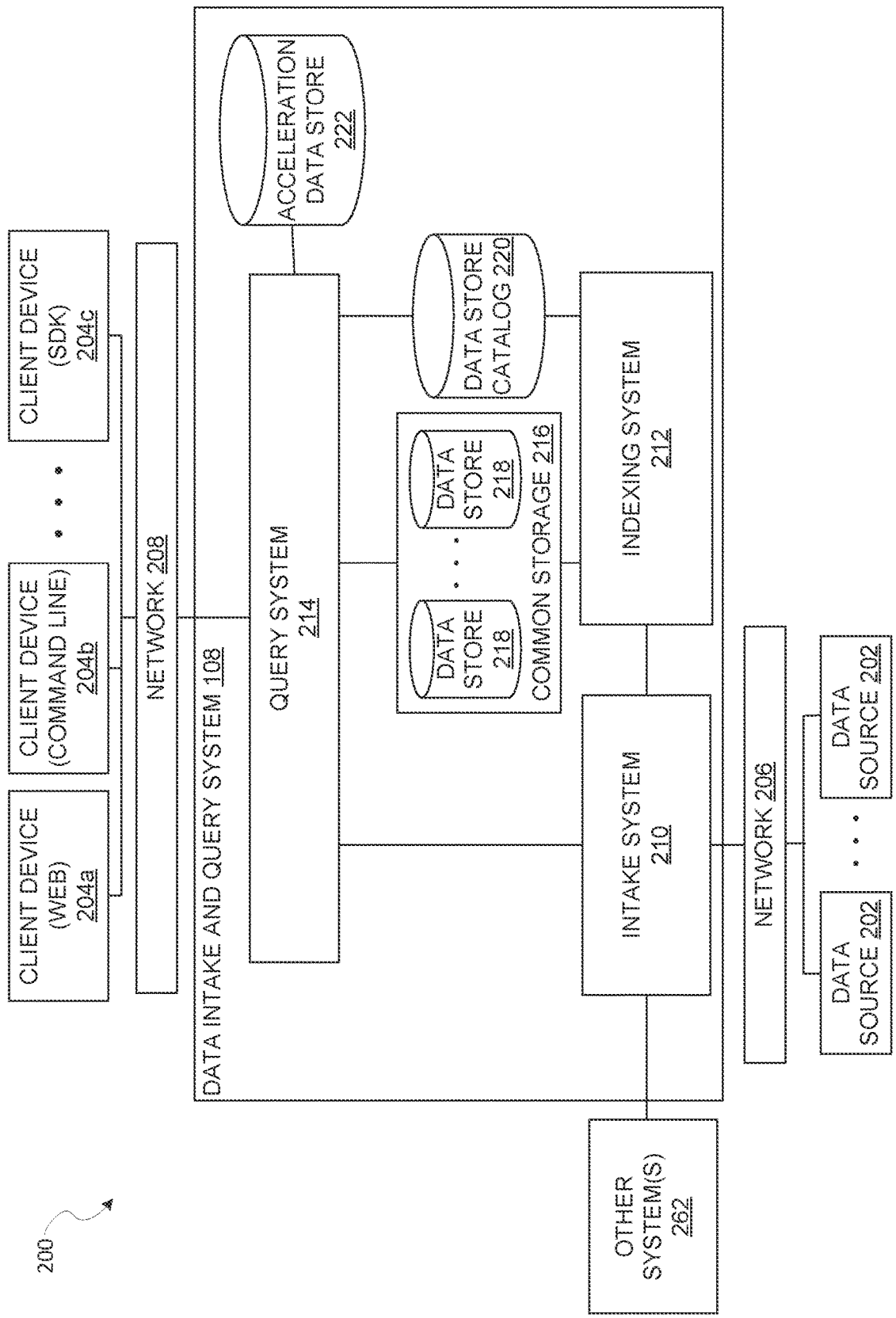
FIG. 2 is a block diagram of an embodiment of a data processing environment, according to some example embodiments.

FIG. 2 is a block diagram of an embodiment of a data processing environment 200, in accordance with some example embodiments. In the illustrated embodiment, the environment 200 includes data sources 202 and client devices 204a, 204b, 204c (generically referred to as client device(s) 204) in communication with the data intake and query system 108 via networks 206, 208, respectively. The networks 206, 208 may be the same network, may correspond to the network 104, or may be different networks. Further, the networks 206, 208 may be implemented as one or more LANs, WANs, cellular networks, intranetworks, and/or internetworks using any of wired, wireless, terrestrial microwave, satellite links, etc., and may include the Internet.

Each data source 202 broadly represents a distinct source of machine data that can be consumed by the data intake and query system 108. Examples of data sources 202 include, without limitation, data files, directories of files, data sent over a network, event logs, registries, streaming data services (examples of which can include, by way of non-limiting example, Amazon's Simple Queue Service ("SQS") or Kinesis™ services, devices executing Apache Kafka™ software, or devices implementing the Message Queue Telemetry Transport (MQTT) protocol, Microsoft Azure EventHub, Google Cloud PubSub, devices implementing the Java Message Service (JMS) protocol, devices implementing the Advanced Message Queuing Protocol (AMQP)), performance metrics, etc.

The client devices 204 can be implemented using one or more computing devices in communication with the data intake and query system 108, and represent some of the different ways in which computing devices can submit queries to the data intake and query system 108. For example, in FIG. 2, the client device 204a communicates over an Internet (Web) protocol with the data intake and query system 108, the client device 204b communicates with the data intake and query system 108 via a command line interface, and the client device 204c communicates with the data intake and query system 108 via a software developer kit (SDK), in accordance with some example embodiments. However, it will be understood that the client devices 204 can communicate with and submit queries to the data intake and query system 108 in a variety of ways.

The data intake and query system 108 can process and store data received data from the data sources 202 and execute queries on the data in response to requests received from the client devices 204. In the illustrated embodiment, the data intake and query system 108 includes an intake system 210, an indexing system 212, a query system 214, common storage 216 including one or more data stores 218, a data store catalog 220, and a query acceleration data store 222.

In some example embodiments, the intake system 210 can receive data from the data sources 202, perform one or more preliminary processing operations on the data, and communicate the data to the indexing system 212, query system 214, or to other systems 262 (which may include, for example, data processing systems, telemetry systems, real-time analytics systems, data stores, databases, etc., any of which may be operated by an operator of the data intake and query system 108 or a third party). The intake system 210 can receive data from the data sources 202 in a variety of formats or structures. In some embodiments, the received data corresponds to raw machine data, structured or unstructured data, correlation data, data files, directories of files, data sent over a network, event logs, registries, messages published to streaming data sources, performance metrics, sensor data, image, and video data, etc. The intake system 210 can process the data based on the form in which it is received. In some cases, the intake system 210 can utilize one or more rules to process data and to make the data available to downstream systems (e.g., the indexing system 212, query system 214,).

As will be described in greater detail herein, at least with reference to FIG. 4, the indexing system 212 can process the data and store it, for example, in the common storage 216. As part of processing the data, the indexing system 212 can identify timestamps associated with the data, organize the data into buckets or time series buckets, convert editable buckets to non-editable buckets, store copies of the buckets in common storage 216, merge buckets, generate indexes of the data, etc. In addition, the indexing system 212 can update the data store catalog 220 with information related to the buckets (pre-merged or merged) or data that is stored in the common storage 216, and can communicate with the intake system 210 about the status of the data storage.

As will be described in greater detail herein, at least with reference to FIG. 5, the query system 214 can receive queries that identify a set of data to be processed and a manner of processing the set of data from one or more client devices 204, process the queries to identify the set of data, and execute the query on the set of data. In some cases, as part of executing the query, the query system 214 can use the data store catalog 220 to identify the set of data to be processed or its location in common storage 216 and/or can retrieve data from common storage 216 or the query acceleration data store 222. In addition, in some embodiments, the query system 214 can store some or all of the query results in the query acceleration data store 222.

As mentioned and as will be described in greater detail below, the common storage 216 can be made up of one or more data stores 218 storing data that has been processed by the indexing system 212. The common storage 216 can be configured to provide high availability, highly resilient, low loss data storage. In some cases, to provide the high availability, highly resilient, low loss data storage, the common storage 216 can store multiple copies of the data in the same and different geographic locations and across different types of data stores (e.g., solid state, hard drive, tape). Further, as data is received at the common storage 216, it can be automatically replicated multiple times according to a replication factor to different data stores across the same and/or different geographic locations. In some embodiments, the common storage 216 can correspond to cloud storage, such as Amazon. Simple Storage Service (S3) or Elastic Block Storage (EBS), Google Cloud Storage, Microsoft Azure Storage, etc.

The query acceleration data store 222 can store the results or partial results of queries, or otherwise be used to accelerate queries. For example, if a user submits a query that has no end date, the query system 214 can store an initial set of results in the query acceleration data store 222. As additional query results are determined based on additional data, the additional results can be combined with the initial set of results, and so on. In this way, the query system 214 can avoid re-searching all of the data that may be responsive to the query and instead search the data that has not already been searched.

Figure 3:
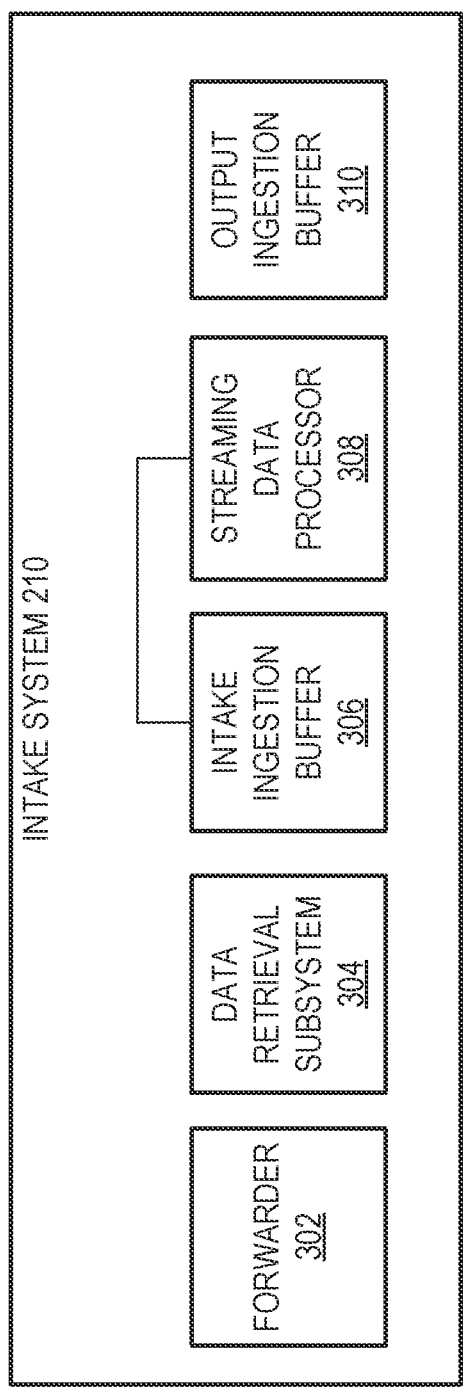
FIG. 3 shows an example architecture of the intake system, according to some example embodiments.

FIG. 3 shows an example architecture of the intake system 210, in accordance with some example embodiments. As illustrated, the intake system 210 includes a forwarder 302, a data retrieval subsystem 304, an intake ingestion buffer 306, a streaming data processor 308, and an output ingestion buffer 310. As described in detail below, the components of the intake system 210 may be configured to process data according to a streaming data model, such that data ingested into the data intake and query system 108 is processed rapidly (e.g., within seconds or minutes of initial reception at the intake system 210) and made available to downstream systems or components. Although shown as separate components, the forwarder 302, data retrieval subsystem 304, intake ingestion buffer 306, streaming data processor 308, and output ingestion buffer 310, in various embodiments, may reside on the same machine or be distributed across multiple machines in any combination.

In some embodiments, some or all of the elements of the intake system 210 (e.g., forwarder 302, data retrieval subsystem 304, intake ingestion buffer 306, streaming data processors 308, and output ingestion buffer 310) may reside on one or more computing devices, such as servers, which may be communicatively coupled with each other and with the data sources 202, query system 214, indexing system 212, or other components. In other embodiments, some or all of the elements of the intake system 210 may be implemented as worker nodes of a cluster computing environment. Further, in some example embodiments, some or all the elements of the intake system 210 can be integrated as a client-side component (e.g., a plugin integrated in client applications 110).

As noted above, the intake system 210 can function to conduct preliminary processing of data ingested at the data intake and query system 108. As such, the intake system 210 illustratively includes a forwarder 302 that obtains data from a data source 202 and transmits the data to a data retrieval subsystem 304. The data retrieval subsystem 304 may be configured to convert or otherwise format data provided by the forwarder 302 into an appropriate format for inclusion at the intake ingestion buffer 306 and transmit the message to the intake ingestion buffer 306 for processing. Thereafter, a streaming data processor 308 may obtain data from the intake ingestion buffer 306, process the data according to one or more rules, and republish the data to either the intake ingestion buffer 306 (e.g., for additional processing) or to the output ingestion buffer 310, such that the data is made available to downstream components or systems. In this manner, the intake system 210 may repeatedly or iteratively process data according to any of a variety of rules, such that the data is formatted for use on the data intake and query system 108 or any other system. As discussed below, the intake system 210 may be configured to conduct such processing rapidly (e.g., in "real-time" with little or no perceptible delay), while ensuring resiliency of the data.

The forwarder 302 can include or be executed on a computing device configured to obtain data from a data source 202 and transmit the data to the data retrieval subsystem 304. In some example embodiments, the intake system 210 may include a number of different forwarders 302. Each forwarder 302 may illustratively be associated with a different data source 202. A forwarder 302 initially may receive the data as a raw data stream generated by the data source 202. For example, a forwarder 302 may receive a data stream from a log file generated by an application server, from a stream of network data from a network device, or from any other source of data. In some embodiments, a forwarder 302 receives the raw data and may segment the data stream into "chunks," possibly of a uniform data size, to facilitate subsequent processing steps. The forwarder 302 may additionally or alternatively modify data received, prior to forwarding the data to the data retrieval subsystem 304. Illustratively, the forwarder 302 may "tag" metadata for each data chunk, such as by specifying a source, source type, or host associated with the data, or by appending one or more timestamp or time ranges to each data chunk.

The data retrieval subsystem 304 illustratively corresponds to a computing device which obtains data (e.g., from the forwarder 302), and transforms the data into a format suitable for publication on the intake ingestion buffer 306. Illustratively, where the forwarder 302 segments input data into discrete blocks, the data retrieval subsystem 304 may generate a message for each chunk (block), and publish the message to the intake ingestion buffer 306. Generation of the message may include "tagging" the message with information (e.g., a batch hash), which may be included as metadata for the data provided by the forwarder 302, and determining a "topic" for the message, under which the message should be published to the intake ingestion buffer 306. In general, the "topic" of a message may reflect a categorization of the message on a streaming data system. Illustratively, each topic may be associated with a logically distinct queue of messages, such that a downstream device or system may "subscribe" to the topic in order to be provided with messages published to the topic on the streaming data system.

The intake system 210 includes at least two logical ingestion buffers: an intake ingestion buffer 306 and an output ingestion buffer 310, according to some example embodiments. As noted above, the intake ingestion buffer 306 can be configured to receive messages from the data retrieval subsystem 304 and resiliently store the message. The intake ingestion buffer 306 can further be configured to transmit the message to the streaming data processors 308 for processing. As further described below, the streaming data processors 308 can be configured with one or more data transformation rules to transform the messages, and republish the messages to one or both of the intake ingestion buffer 306 and the output ingestion buffer 310. The output ingestion buffer 310, in turn, may make the messages available to various subscribers to the output ingestion buffer 310, which subscribers may include the query system 214, the indexing system 212, or other third-party devices (e.g., client devices 102, host devices 106).

Both the intake ingestion buffer 306 and output ingestion buffer 310 may be implemented on a streaming data source, as noted above. In one embodiment, the intake ingestion buffer 306 operates to maintain source-oriented topics, such as topics for each data source 202 from which data is obtained, while the output ingestion buffer 310 operates to maintain content-oriented topics, such as topics to which the data of an individual message pertains. As discussed in more detail below, the streaming data processors 308 can be configured to transform messages from the intake ingestion buffer 306 (e.g., arranged according to source-oriented topics) and publish the transformed messages to the output ingestion buffer 310 (e.g., arranged according to content-oriented topics). In some instances, the streaming data processors 308 may additionally or alternatively republish transformed messages to the intake ingestion buffer 306, enabling iterative or repeated processing of the data within the message by the streaming data processors 308.

Figure 4:
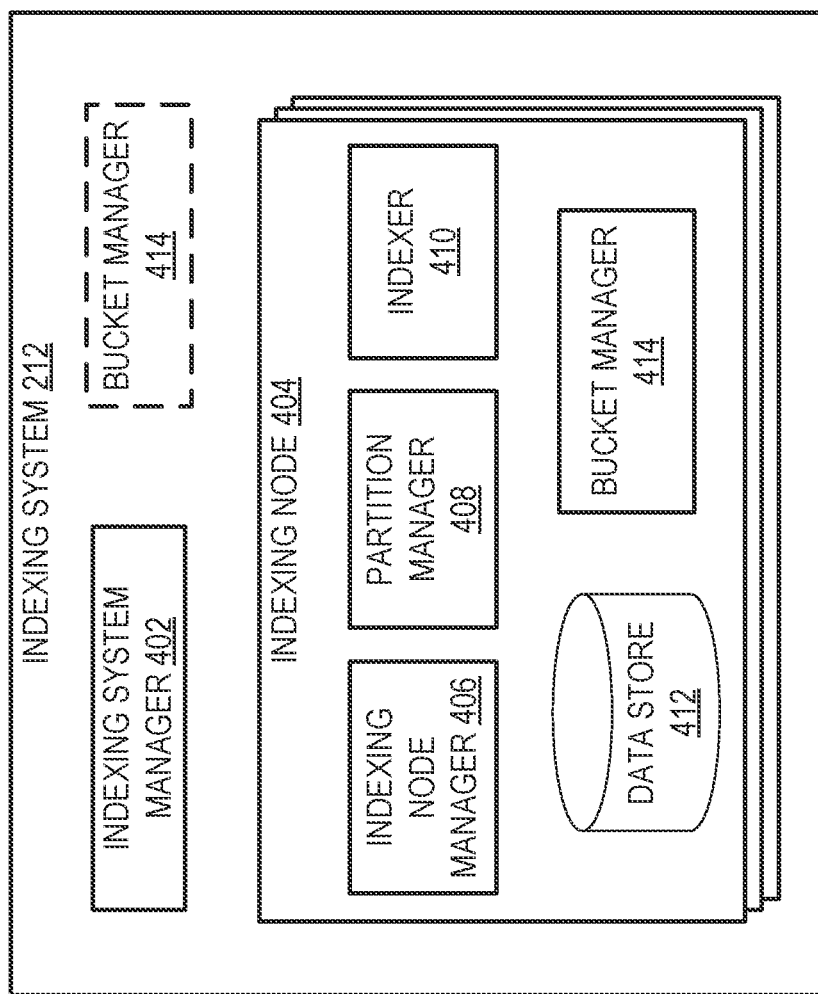
FIG. 4 is a block diagram illustrating an indexing system, according to some example embodiments.

FIG. 4 is a block diagram illustrating an embodiment of the indexing system 212 of the data intake and query system 108. The indexing system 212 can receive, process, and store data from multiple data sources 202, which may be associated with different tenants, users, etc. Using the received data, the indexing system 212 can generate events that include a portion of machine data associated with a timestamp and store the events in buckets based on one or more of the timestamps, tenants, indexes, etc., associated with the data.

In the illustrated embodiment, the indexing system 212 includes an indexing system manager 402 and one or more indexing nodes 404. The indexing system manager 402 can monitor and manage the indexing nodes 404, and can be implemented as a distinct computing device, virtual machine, container, container of a pod, or a process or thread associated with a container. In certain embodiments, the indexing system 212 can include one indexing system manager 402 to manage all indexing nodes 404 of the indexing system 212. In some embodiments, the indexing system 212 can include multiple indexing system managers 402, The indexing system manager 402 can handle resource management, creation/destruction of indexing nodes 404, high availability, load balancing, application upgrades/rollbacks, logging and monitoring, storage, networking, service discovery, and performance and scalability, and otherwise handle containerization management of the containers of the indexing system 212. In certain embodiments, the indexing system manager 402 can be implemented using Kubernetes or Swarm.

In the illustrated embodiment, the indexing node 404 includes an indexing node manager 406, partition manager 408, indexer 410, data store 412, and bucket manager 414. The indexing node manager 406 can manage the processing of the various streams or partitions of data by the indexing node 404, and can be implemented as a distinct computing device, virtual machine, container, container of a pod, or a process or thread associated with a container. In some embodiments, the indexing node manager 406 monitors the various shards of data being processed by the indexing node 404 and read pointers or location markers for those shards. In some embodiments, the indexing node manager 406 stores the read pointers or location marker in one or more data stores, such as but not limited to, the common storage 216, DynamoDB, S3, or another type of storage system, shared storage system, or networked storage system, etc.

The partition manager(s) 408 can manage the processing of one or more of the partitions or shards of a data stream processed by the indexing node 404 or the indexer 410 of the indexing node 404, and can be implemented as a distinct computing device, virtual machine, container, container of a pod, or a process or thread associated with a container. In some cases, managing the processing of a partition or shard can include, but is not limited to, communicating data from a particular shard to the indexer 410 for processing, monitoring the indexer 410 and the size of the data being processed by the indexer 410, instructing the indexer 410 to move the data to common storage 216, and reporting the storage of the data to the intake system 210.

The indexer 410 can be the primary indexing execution engine, and can be implemented as a distinct computing device, container, container within a pod, in accordance with some example embodiments. For example, the indexer 410 can be tasked with parsing, processing, indexing, and storing the data received from the intake system 210 via the partition manager(s) 408. In some embodiments, the indexer 410 can store the events and buckets in the data store 412 according to a bucket creation policy.

The bucket creation policy can indicate how many buckets the indexer 410 is to generate for the data that it processes. As described herein, buckets in the data store 412 that are being edited by the indexer 410 can be referred to as hot buckets or editable buckets. For example, the indexer 410 can add data, events, and indexes to editable buckets in the data store 412, etc. Buckets in the data store 412 that are no longer edited by the indexer 410 can be referred to as warm buckets or non-editable buckets. In some embodiments, once the indexer 410 determines that a hot bucket is to be copied to common storage 216, it can convert the hot (editable) bucket to a warm (non-editable) bucket, and then move or copy the warm bucket to the common storage 216. Once the warm bucket is moved or copied to common storage 216, the indexer 410 can notify the partition manager 408 that the data associated with the warm bucket has been processed and stored.

The bucket manager 414 can manage the buckets stored in the data store 412, and can be implemented as a distinct computing device, virtual machine, container, container of a pod, or a process or thread associated with a container. In some cases, the bucket manager 414 can be implemented as part of the indexer 410, indexing node 404, or as a separate component of the indexing system 212.

The bucket merge policy can indicate which buckets are candidates for a merge or which bucket to merge (e.g., based on time ranges, size, tenant/partition or other identifiers), the number of buckets to merge, size or time range parameters for the merged buckets, and/or a frequency for creating the merged buckets. For example, the bucket merge policy can indicate that a certain number of buckets are to be merged, regardless of size of the buckets. As another non-limiting example, the bucket merge policy can indicate that multiple buckets are to be merged until a threshold bucket size is reached (e.g., 750 MB, or 1 GB, or more). As yet another non-limiting example, the bucket merge policy can indicate that buckets having a time range within a set period of time (e.g., 30 sec, 1 min.) are to be merged, regardless of the number or size of the buckets being merged.

In addition, the bucket merge policy can indicate which buckets are to be merged or include additional criteria for merging buckets. For example, the bucket merge policy can indicate that only buckets having the same tenant identifier and/or partition are to be merged, or set constraints on the size of the time range for a merged bucket (e.g., the time range of the merged bucket is not to exceed an average time range of buckets associated with the same source, tenant, partition).

In some example embodiments, the bucket management policy can indicate that once queries using the pre-merged buckets are completed, the buckets are to be removed from common storage 216. However, it will be understood that the bucket management policy can indicate removal of the buckets in a variety of ways. For example, per the bucket management policy, the common storage 216 can remove the buckets after one or more hours, one day, one week, etc., with or without regard to queries that may be relying on the pre-merged buckets. In some embodiments, the bucket management policy can indicate that the pre-merged buckets are to be removed without regard to queries relying on the pre-merged buckets and that any queries relying on the pre-merged buckets are to be redirected to the merged bucket.

Figure 5:
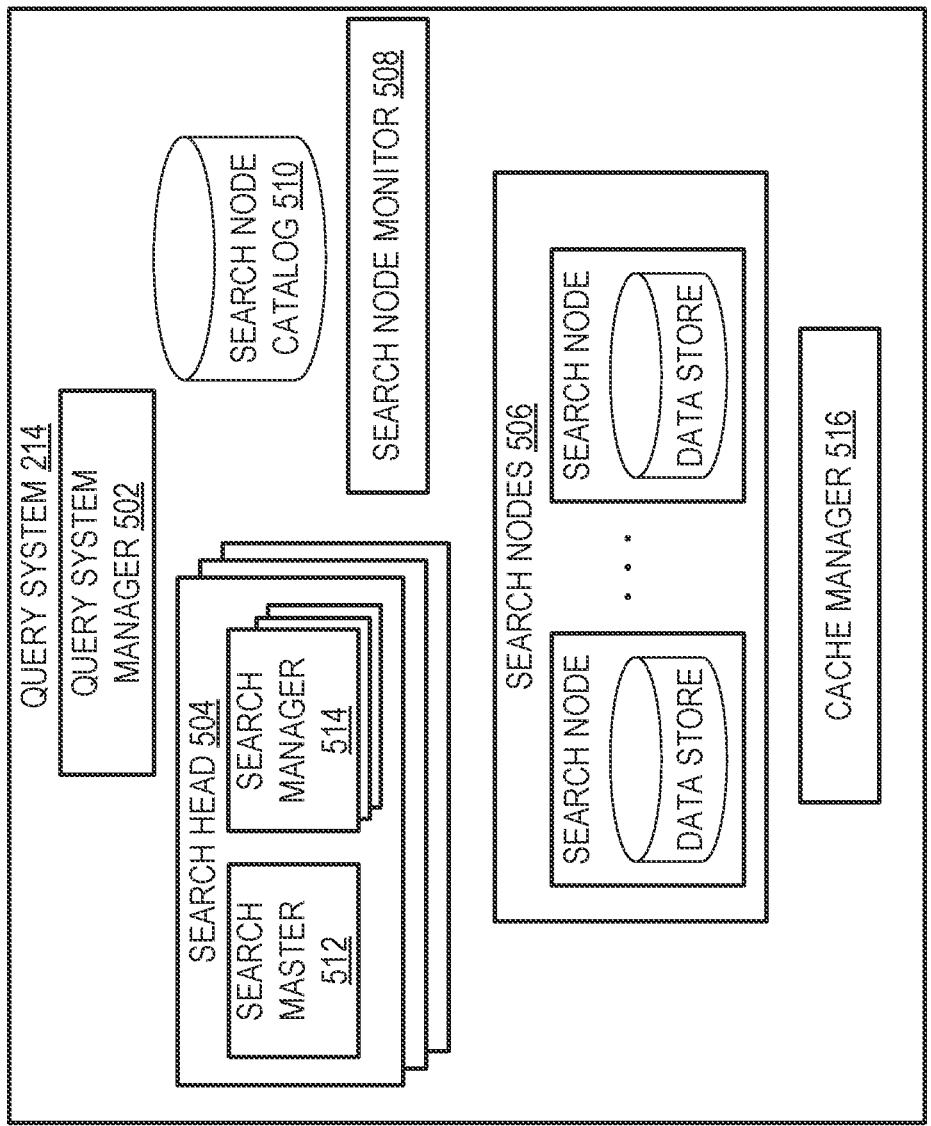
FIG. 5 is a block diagram illustrating a query system, according to some example embodiments.

FIG. 5 is a block diagram illustrating an embodiment of the query system 214 of the data intake and query system 108. The query system 214 can receive, process, and execute queries from multiple client devices 204. In the illustrated embodiment, the query system 214 includes one or more query system managers 502 (collectively or individually referred to as query system manager 502), one or more search heads 504 (collectively or individually referred to as search head 504 or search heads 504), one or more search nodes 506 (collectively or individually referred to as search node 506 or search nodes 506), a search node monitor 508, and a search node catalog 510.

The query system manager 502 can monitor and manage the search heads 504 and search nodes 506, and can be implemented as a distinct computing device, virtual machine, container, container of a pod, or a process or thread associated with a container. For example, the query system manager 502 can determine which search head 504 is to handle an incoming query or determine whether to generate an additional search node 506 based on the number of queries received by the query system 214 or based on another search node 506 becoming unavailable or unresponsive.

In some example embodiments, the query system manager 502 can handle resource management, creation, assignment, or destruction of search heads 504 and/or search nodes 506, high availability, load balancing, application upgrades/rollbacks, logging and monitoring, storage, networking, service discovery, and performance and scalability, and otherwise handle containerization management of the containers of the query system 214. In certain embodiments, the query system manager 502 can be implemented using Kubernetes or Swarm. For example, in certain embodiments, the query system manager 502 may be part of a sidecar or sidecar container that allows communication between various search nodes 506, various search heads 504, and/or combinations thereof.

The search heads 504 can manage the execution of queries received by the query system 214. For example, the search heads 504 can parse the queries to identify the set of data to be processed and the manner of processing the set of data, identify the location of the data, identify tasks to be performed by the search head 504 and tasks to be performed by the search nodes 506, distribute the query (or sub-queries corresponding to the query) to the search nodes 506, apply extraction rules to the set of data to be processed, aggregate search results from the search nodes 506, store the search results in the query acceleration data store 222, etc. In some embodiments, the search heads 504 may be implemented using multiple related containers. In certain embodiments, such as in a Kubernetes deployment, each search head 504 can be implemented as a separate container or pod. For example, one or more of the components of the search head 504 can be implemented as different containers of a single pod (e.g., on a containerization platform), such as Docker, and the one or more components of the indexing node 404 can be implemented as different Docker containers managed by synchronization platforms such as Kubernetes or Swarm.

A search master 512 can manage the execution of the various queries assigned to the search head 504, and can be implemented as a distinct computing device, virtual machine, container, container of a pod, or a process or thread associated with a container. For example, in certain embodiments, as the search head 504 is assigned a query, the search master 512 can generate one or more search manager(s) 514 to manage the query. The search master 512 can track and store the queries assigned to the different search managers 514.

The search managers 514 can manage the processing and execution of the queries assigned to the search head 504, and can be implemented as a distinct computing device, virtual machine, container, container of a pod, or a process or thread associated with a container. In some embodiments, one search manager 514 manages the processing and execution of one query at a time. In such embodiments, if the search head 504 is processing one hundred queries, the search master 512 can generate one hundred search managers 514 to manage the one hundred queries. Upon completing an assigned query, the search manager 514 can await assignment to a new query or be terminated.

In some cases, to aid in identifying the set of data to be processed, the search manager 514 can consult the data store catalog 220 (depicted in FIG. 2). As described herein, the data store catalog 220 can include information regarding the data stored in the common storage 216. In some cases, the data store catalog 220 can include bucket identifiers, a time range, and a location of the buckets in the common storage 216. In addition, the data store catalog 220 can include a tenant identifier and partition identifier for the buckets. This information can be used to identify buckets that include data that satisfies at least a portion of the query.

In certain embodiments, a search node mapping policy can indicate that the search manager 514 is to use a consistent hash function or other function to consistently map a bucket to a particular search node 506. The search manager 514 can perform the hash using the bucket identifier obtained from the data store catalog 220, and the output of the hash can be used to identify the search node 506 assigned to the bucket. In some cases, the consistent hash function can be configured such that even with a different number of search nodes 506 being assigned to execute the query, the output will consistently identify the same search node 506, or have an increased probability of identifying the same search node 506.

In some embodiments, the query system 214 can store a mapping of search nodes 506 to bucket identifiers. The search node mapping policy can indicate that the search manager 514 is to use the mapping to determine whether a particular bucket has been assigned to a search node 506. If the bucket has been assigned to a particular search node 506 and that search node 506 is available, Linen the search manager 514 can assign the bucket to the search node 506. If the bucket has not been assigned to a particular search node 506, the search manager 514 can use a hash function to identify a search node 506 for assignment. Once assigned, the search manager 514 can store the mapping for future use.

As the search manager 514 processes the results or completes processing the results, it can store the results in the query acceleration data store 222 or communicate the results to a client device 204, As described herein, results stored in the query acceleration data store 222 can be combined with other results over time. For example, if the query system 214 receives an open-ended query (e.g., no set end time), the search manager 514 can store the query results over time in the query acceleration data store 222.

Query results in the query acceleration data store 222 can be updated as additional query results are obtained. In this manner, if an open-ended query is run at time B, query results may be stored from initial time A to time B. If the same open-ended query is run at time C, then the query results from the prior open-ended query can be obtained from the query acceleration data store 222 (which gives the results from time A to time B), and the query can be run from time B to time C and combined with the prior results, rather than running the entire query from time A to time C. In this manner, the computational efficiency of ongoing search queries can be improved.

The search nodes 506 can be the primary query execution engines for the query system 214, and can be implemented as distinct computing devices, virtual machines, containers, container of a pods, or processes or threads associated with one or more containers. Accordingly, each search node 506 can include a processing device and a data store, as depicted at a high level in FIG. 5. Depending on the embodiment, the processing device and data store can be dedicated to the search node (e.g., embodiments where each search node is a distinct computing device) or can be shared with other search nodes or components of the data intake and query system 108 (e.g., embodiments where the search nodes are implemented as containers or virtual machines or where the shared data store is a networked data store).

In some embodiments, the search nodes 506 can obtain and search buckets identified by the search manager 514 that include data that satisfies at least a portion of the query, identify the set of data within the buckets that satisfies the query, perform one or more transformations on the set of data, and communicate the set of data to the search manager 514. Individually, the search node 506 can obtain the buckets assigned to it by the search manager 514 for a particular query, search the assigned buckets for a subset of the set of data, perform one or more transformation on the subset of data, and communicate partial search results to the search manager 514 for additional processing and combination with the partial results from other search nodes 506.

In some example embodiments, a cache manager 516 can communicate with the search nodes 506 to obtain or identify the location of the buckets assigned to the search nodes 506, and can be implemented as a distinct computing device, virtual machine, container, container of a pod, or a process or thread associated with a container. In some embodiments, based on the receipt of a bucket assignment, the search node 506 can provide the cache manager 516 with an identifier of the bucket that it is to search, a file associated with the bucket that it is to search, and/or a location of the bucket. In response, the cache manager 516 can determine whether the identified bucket or file is located in a local or shared data store or is to be retrieved from the common storage 216.

Figure 6:
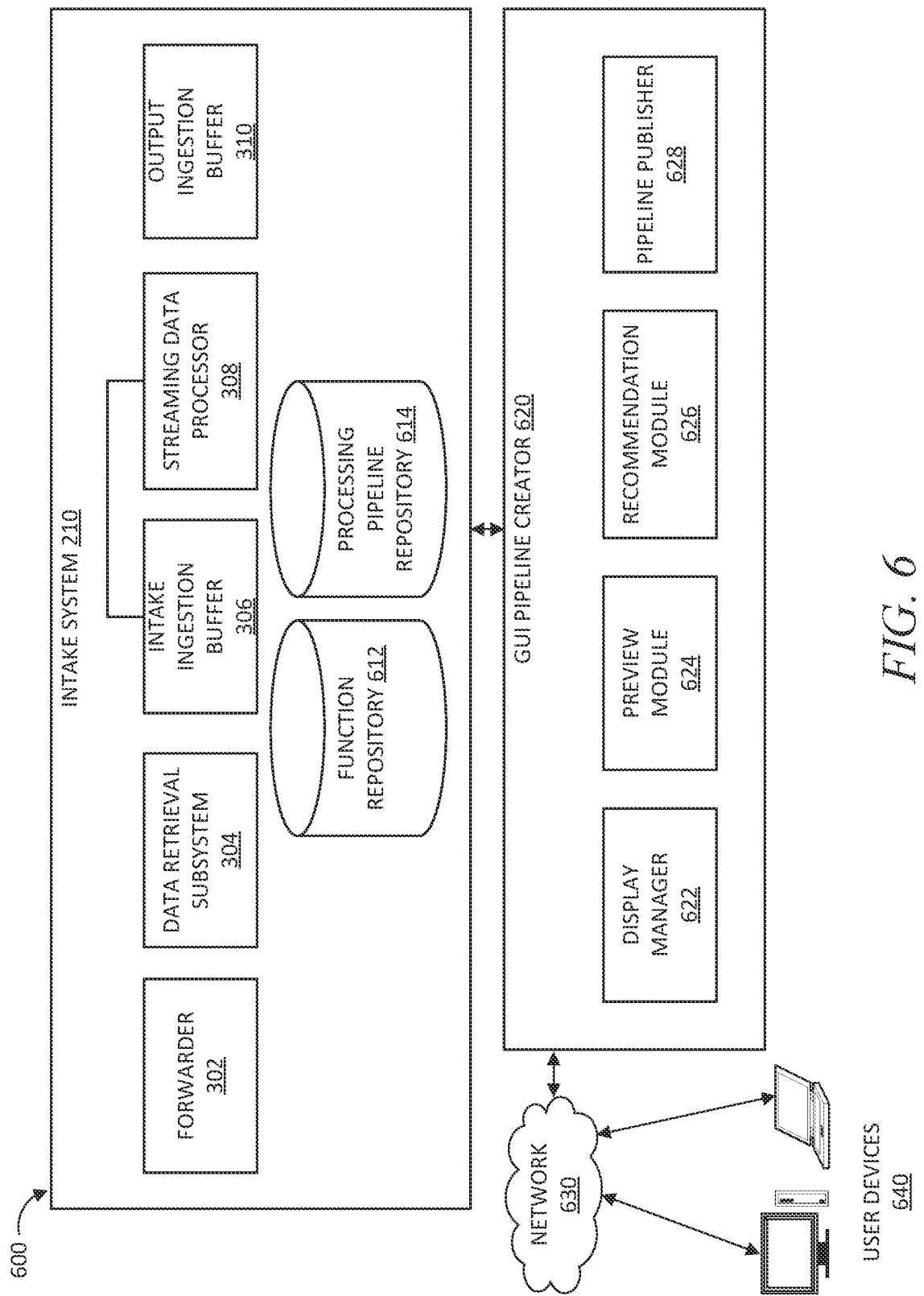
FIG. 6 is a block diagram illustrating a graphical interface for designing data processing pipelines, according to some example embodiments.

FIG. 6 is a block diagram of one embodiment a graphical programming system 600 that provides a graphical interface for designing data processing pipelines, in accordance with example embodiments. As illustrated by FIG. 6, the graphical programming system 600 can include an intake system 210, similar to that described above. In FIG. 6, the intake system 210 is depicted as having additional components that communicate with the graphical user interface ("GUI") pipeline creator 620, including the function repository 612 and the processing pipeline repository 614. The function repository 612 includes one or more physical storage devices that store data representing functions (e.g., a construct or command) that can be implemented by the streaming data processor 308 to manipulate information from an intake ingestion buffer 306, as described herein. The processing pipeline repository 614 includes one or more physical storage devices that store data representing processing pipelines, for example processing pipelines created using the GUIs described herein. A processing pipeline representation stored by the processing pipeline repository 614 includes an abstract syntax tree or AST, and each node of the AST can denote a construct or command occurring in the pipeline. An AST can be a tree representation of the abstract syntactic structure of source code written in a programming language. Each node of the tree can denote a construct occurring in the source code.

The GUI pipeline creator 620 can manage the display of graphical interfaces as described herein, and can convert visual processing pipeline representations into ASTs for use by the intake system 210. The GUI pipeline creator 620 can be implemented on one or more computing devices. For example, some implementations provide access to the GUI pipeline creator 620 to user computing devices 640 remotely through network 630, and the GUI pipeline creator 620 can be implemented on a server or cluster of servers. The GUI pipeline creator 620 includes a number of modules including the display manager 622, preview module 624, recommendation module 626, and pipeline publisher 628. These modules can represent program instructions that configure one or more processor(s) to perform the described functions.

The display manager 622 can generate instructions for rendering a graphical processing pipeline design interface, for example the interfaces depicted in the illustrative embodiments of the drawings. In one embodiment, the instructions include markup language, such as hypertext; markup language (HTML). The display manager 622 can send these instructions to a user device 640 which can in turn display the interface to a user and determine interactions with features of the user interface. For example, the display manager 622 may transmit the instruction via hypertext transport protocol, and the user device 640 may execute a browser application to render the interface. The display manager 622 can receive indications of the user interactions with the interface and update the instructions for rendering the interface accordingly. Further, the display manager 622 can log the nodes and interconnections specified by the user for purposes of creating a computer-readable representation of the visually programmed processing pipeline designed via the interface.

The preview module 624 can manage the display of previews of data flowing through the described processing pipelines. For example, the preview module 624 can replace write functions with preview functions and add preview functions to other types of functions, where such preview functions capture a specified quantity of data output by particular nodes and also prevent deployment of an in-progress pipeline for writing to external systems. The preview functions that replace write functions can be considered as equivalent to the write functions, but without the end result of writing information to an external database. The preview module 624 can communicate with the display manager 622 to generate updates to the disclosed graphical interfaces that reflect the preview data.

The recommendation module 626 can analyze various elements of data processing pipelines in order to recommend certain changes to users creating the pipelines. These changes can include, in various embodiments, entire predefined templates, filtered subsets of nodes compatible with upstream nodes, specific recommended nodes, and conditional branching recommendations. The recommendation module 626 can implement machine learning techniques in some implementations in order to generate the recommendations, as described in further detail below. The recommendation module 626 can access historical data for a particular user or a group of users in order to learn which recommendations to provide.

The pipeline publisher 628 can convert a visual representation of a processing pipeline into a format suitable for deployment, for example an AST or a form of executable code. The pipeline publisher 628 can perform this conversion at the instruction of a user (e.g., based on the user providing an indication that the pipeline is complete) in some implementations. The pipeline publisher 628 can perform this conversion to partially deploy an in-progress pipeline in preview mode in some implementations.

Figure 7:
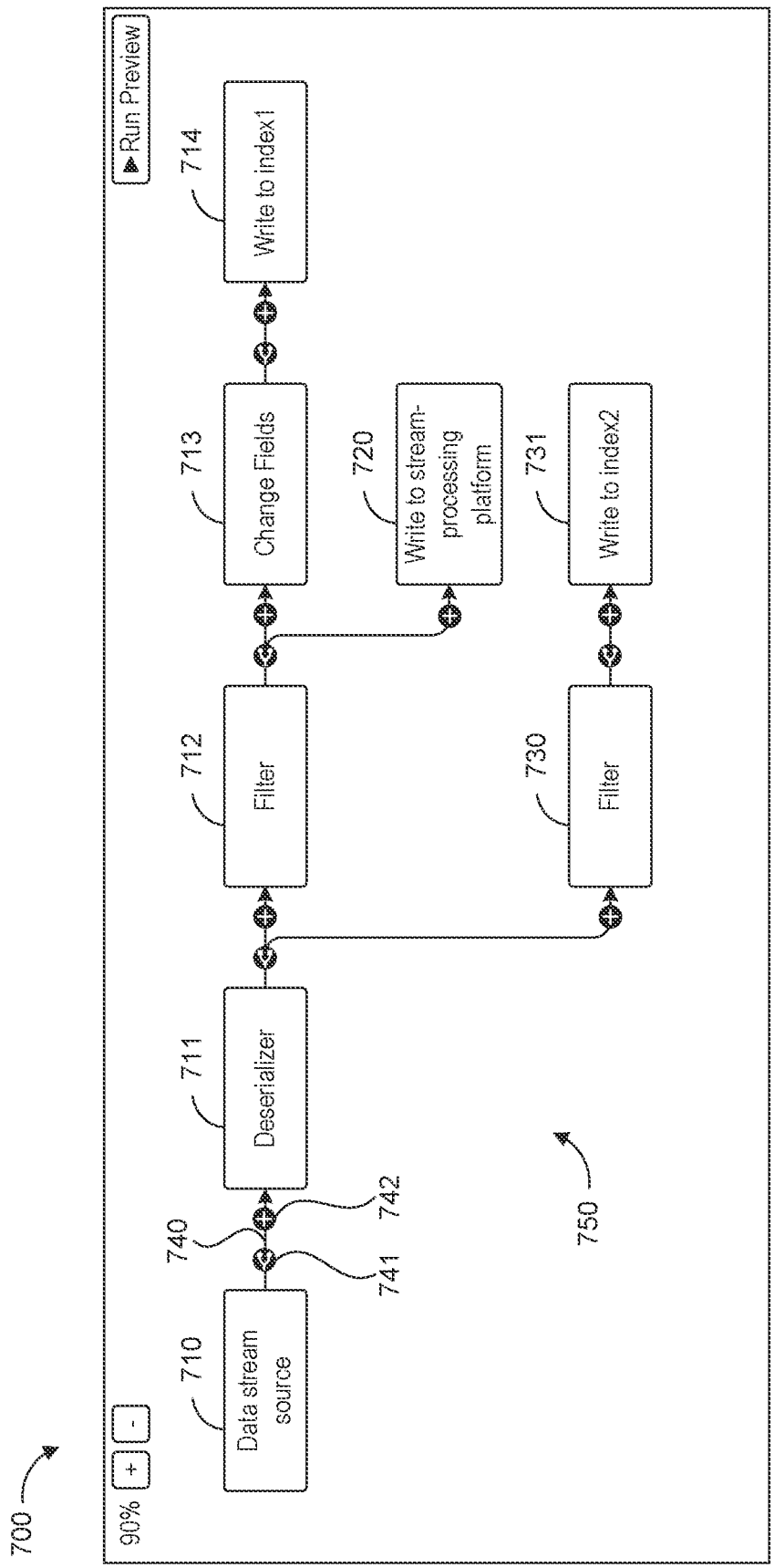
FIG. 7 depicts an example processing pipeline with a particular configuration, according to some example embodiments.

FIG. 7 is an interface diagram of an example graphical user interface 700 that provides a free-form graphical canvas for building data processing pipelines, in accordance with example embodiments. A user may enter the canvas graphical user interface 700 from another menu or interface that allows the user to specify a source node, transformation node, or write node and build their pipeline in either or both directions as needed. An example of a processing pipeline 750 with a particular configuration is illustrated in FIG. 7; though it is appreciated it is provided to illustrate and not limit the types of processing pipelines that can be visually assembled in the canvas graphical user interface 700. The visual representation of the processing pipeline 750 is shown with example boxes including text to indicate the type of source, destination, or function represented by a node. It will be appreciated that the visual representation of the nodes may vary in other implementations, for example including icons that graphically depict the nature of the node.

The visual representation of the processing pipeline 750 depicts a series of interconnected nodes 710, 711, 712, 713, 714, 720, 730, 731. Node 710 corresponds to a data stream source, and nodes 714, 720, and 731 correspond to writes to various data destinations. It will be appreciated that data processing pipelines as described herein can each include one or more data sources and one or more data destinations. The remaining nodes specify transformations performed on messages transmitted between the source and the destinations. Interconnections between the nodes that represent routing of data between the nodes are depicted by interconnections 740. The interconnections specify that this particular example processing pipeline includes three branches a first branch from the source at node 710 to index1 at node 714 that, includes nodes 711, 712, and 713, a second branch from the source at node 710 to a stream processing platform at node 720 that also includes nodes 711 and 712, and a third branch from the source at node 710 to index2 at node 731 that includes nodes 711 and 730. The graphical interface 700 can be used to design branches that route data from a single source to multiple destinations, to merge data from multiple sources to a single destination, and to connect multiple data sources to multiple data destinations, depending upon the specification of the user.

During creation of the processing pipeline 750, the user can select certain user-selectable features on the interconnections (e.g., elements 741 and 742) to modify the processing pipeline 750. For example, selection of branching element 741 can instruct the GUI pipeline creator 620 to add a node along a new branch (e.g., beginning at a current node "upstream" of the element 742, such as node 710, and allowing specification of a new node "downstream" of the element 742). Selection of the node addition element 742 can instruct the GUI pipeline creator 620 to acid a node along the same branch (e.g., between a current node "upstream" of the element 742, such as node 710, and a current node "downstream." of the element 742, such as node 711). The graphical interface for node addition is described with respect to FIG. 8. When nodes or branches are added, the display manager 622 can automatically scale, space, and align the specified nodes for the user. Specifically, when a node is added along an existing branch the display manager 622 can place the node in the specified location (e.g., after the interconnection on which the node addition element 742 was selected) and in-line with other nodes in the branch, and the display manager (322 can evenly space the new set of nodes along that branch. When a new branch is added, the display manager 622 can vertically align the first node in that branch with a next node in the other branch (e.g., a node located after the branching interconnection). The display manager 622 can also draw interconnections corresponding to the user-specified node and branch configurations to illustrate the routing of data between nodes. If the addition of the new node or branch causes the processing pipeline 750 to become larger than the display window size, the display, manager 622 can automatically scale the processing pipeline 750 to fit within the window. The user may also be able to manually zoom in and out. Beneficially, this allows the user to more quickly specify the processing functions for the processing pipeline 750, because the display manager 622 handles the "drawing" aspect of creating the visual representation, so the user does not have to spend time on manually drawing the visual representation. Thus, the display manager 622 may store a set of rules for how to automatically scale, space, and align specified nodes and branches.

The graphical interface 700 can include additional interactive features that enable users to design their pipelines. For example, when a user hovers over a node, an "X" or other suitable icon can appear (for example on a corner of the node) that enables the user to delete the node from the pipeline. If the deleted node was in between two nodes, then the canvas can automatically "collapse" around the deleted node so that the upstream input to the deleted node becomes the input for the node that was downstream of the deleted node, Some implementations can enable a user to delete a node by dragging the node to a trash can icon.

In some implementations, clicking or selecting a blank area on the canvas graphical user interface can enable a user to add a data source. Selecting to add a data source may bring up a list of available data sources. In some embodiments, this may be a general list of all available data sources, such as "AWS" or "firewall." In some embodiments, this list may be based on actual data sources that the system is aware of based on the user or tenant's profile or other saved data. In some implementations, if a node function (such as union) supports more than one input, than an icon similar to the branching element 741 can be displayed along an interconnection leading into that node. Selection of this feature can allow the user to add another node, such as a source node, in front of the node. If a node does not have an input, an icon similar to the node addition element 742 can be displayed along an interconnection leading into that node. Selection of this feature can allow the user to add another node in front of this node.

For purposes of illustrating the described processing pipelines, the following discussion will walk through the operations performed by the intake system 210 to implement functionality corresponding to each of the nodes in this example processing pipeline 750 when it is implemented by the intake system 210. It will be appreciated that the node functions can vary depending upon particular implementations and may include other processing functions and/or other orders of processing functions. The present example is also described in the context of an iterative publish-subscribe message processing system, but it will be appreciated that the disclosed GUI can be used to build other types of streaming processing pipelines.

In this example, the intake system 210 can assign each node of the processing pipeline to its own topic on an intake ingestion buffer 306. The intake system 210 can implement an individual node of the processing pipeline by retrieving messages to be processed according to the node from a topic on the intake ingestion buffer 306 corresponding to a source for the node, applying a data manipulation corresponding to the node to transform the message, and then enqueuing the transformed messages in a topic of the intake ingestion buffer 306 corresponding to the individual node. This processing can be repeated for each node, such that data is iteratively processed by the intake system 210 before being written to a final destination. In some instances, intake system 210 may create multiple topics on an ingestion buffer 306 for an individual node. For example, where a node is a conditional routing node, such that some messages are routed through a first output of the node and other messages are routed through a second output of the node, the intake system 210 may create a topic on the ingestion buffer 306 corresponding to each potential output of the node. The intake system 210 may then obtain messages from an appropriate topic when implementing processing corresponding to a downstream node.

To begin, the intake system 210 can implement node 710 by obtaining data from the specified source (e.g., streaming data services including Amazon's SQS or Kinesis™ services, devices executing Apache Kafka™ software, devices implementing the MQTT protocol, Microsoft Azure EventHub, Google Cloud PubSub, devices implementing the JMS protocol, devices implementing AMQP). Each message obtained at the intake ingestion buffer 306 as a result of implementation of node 710 can then be saved to a topic on the ingestion buffer 306 corresponding to node 710 (e.g., the "710 topic").

Based on its interconnection to node 710, node 711 can configure the intake system 210 to obtain messages from the intake ingestion buffer 306 corresponding to the topic, apply a deserialization transform (the data manipulation designated by a deserialization node), and enqueue the transformed messages onto a topic on the ingestion buffer 306 corresponding to node 711. Illustratively, the deserialization transform can apply a deserialization technique to data within a source message, which techniques are known in the art. Illustratively, deserialization can take data that has been formatted as a sequence of bytes for serialized data transmission and rebuild that data into an object. This can take the serialized data and transform it into human readable data for analysis during the preview mode described below.

Continuing along the upper branch of the processing pipeline 750, based on its interconnection to node 711, node 712 can configure the intake system 210 to obtain messages from the intake ingestion buffer 306 corresponding to node 711, apply a filter transform (the data manipulation designated by a filer node), and enqueue the transformed messages onto a topic on the ingestion buffer 306 corresponding to node 712. The filter may selectively pass certain types of data and not others, for example passing data from particular source(s), corresponding to particular event(s), or having other specified properties.

Based on its interconnection to node 712, node 713 can configure the intake system 210 to obtain the messages and apply a change fields transform (the data manipulation designated by a change fields node), and enqueue the transformed messages onto a topic on the ingestion buffer 306 corresponding to node 713. The change fields transform can extract attributes from the data that can be recognized by downstream data destination(s).

Based on its interconnection to node 713, node 714 can configure the intake system 210 to obtain the messages from the topic mailbox and write the messages to index1. It will be appreciated that some implementations can collapse the node for writing to an external source with the previous transform node in implementation, such that node 713 would configure the intake system 210 to obtain the messages from node 712, apply a change fields transform (the data manipulation designated by a change fields node), and enqueue the transformed messages onto a topic on the ingestion buffer 306 corresponding to node 714. It can be beneficial to keep the nodes separated prior to publishing the processing pipeline 750 for purposes of the preview mode described below.

The processing pipeline 750 splits into another branch after node 712. On this second branch, node 720 can configure the intake system 210 to obtain the messages from the intake ingestion buffer 306 corresponding to node 712 and write the messages to a specified stream-processing platform.

The processing pipeline 750 also splits into another branch after node 711. On this third branch, node 730 can configure the intake system 210 to obtain the messages from the node 711 mailbox, apply a filter transform (the data manipulation designated by a filter node), and enqueue the transformed messages onto a topic on the ingestion buffer 306 corresponding to node 730. This filter may pass a different set of data than the filter implemented by node 712. Based on its interconnection to node 730, node 731 can configure the intake system 210 to obtain the messages from the node 730 mailbox and write the messages to index2. It will be appreciated that some implementations can collapse nodes 730 and 731 after publication of the processing pipeline 750.

Collapsing of two nodes can refer to configuring the intake system 210 to apply two transformations at the same time without an intervening publication to a topic. Node collapsing can be applied in a few different scenarios. In one scenario, two nodes can be in sequence without any potential rerouting, such that all messages (which are not dropped) always follow a given path. In another scenario, collapsing occurs where there is a split in routing. For example, where a conditional node routes to two transform nodes, the system could logically replace that grouping of nodes by duplicating the stream, and applying a conditional node in front of each transform node (such that any messages that the conditional would not route to the transform under representation A are dropped under representation. B).

In this manner, the processing pipeline 750 can be considered as a tree or directed graph of nodes, where data flows in a specific direction from node to node along the interconnections. The pipeline publisher 628 can generate an AST corresponding to these nodes and interconnections. In some implementations, each modification to the pipeline in the graphical interface can cause a corresponding update in the in-memory AST to avoid having an explicit transformation step. This can be accomplished by having an event listener in the code for the graphical interface that receives an event any time the user manipulates the pipeline. If any nodes in the pipeline were configured with DSL expressions, the application managing the user interface on the user device can call back to the GUI pipeline creator 620 to convert the DSL expressions into sub-ASTs and to merge them back into the full. AST prior to executing a preview or activating the pipeline. For example, the pipeline publisher 628 can identify various commands that are to be executed as part of the processing pipeline and generate a tree (AST), where each node can denote a construct or command Occurring in the query. The particular operations of other processing pipelines created using the graphical interface 700 can vary from this example based on the user-specified nodes and interconnections; however, the publish-subscribe operation of interconnected nodes can generally follow the example presented above.

Although the example provided above describes enqueuing messages on the intake ingestion buffer 306 between node functions, other implementations of the system may not use the ingestion buffer to queue messages between functions. For example, a pipeline can be collapsed into a single processing job.

Figure 8:
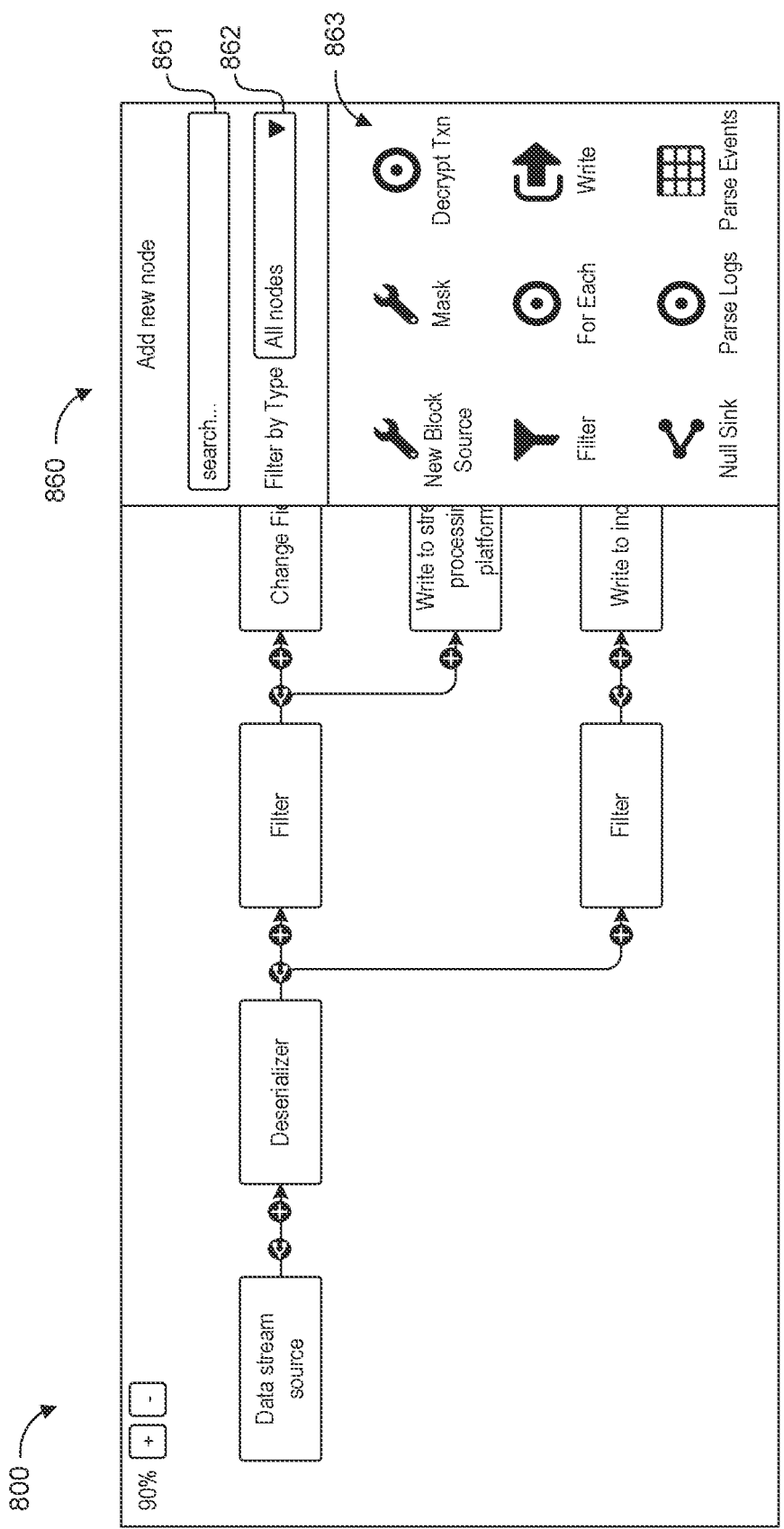
FIG. 8 is an interface diagram of an example graphical interface managing nodes in processing pipelines, according to some example embodiments.

FIG. 8 is an interface diagram of an example graphical interface 800 for adding nodes to create and edit data processing pipelines, in accordance with example embodiments. As illustrated, the graphical interface 800 includes a node addition menu 860 that overlays the pipeline creation interface 800. The node addition menu 860 may be displayed responsive to user selection of elements 741 and 742 (FIG. 7) in some implementations. In some implementations, the node addition menu 860 may be displayed responsive to user navigation to a particular part of the graphical interface 700 (e.g., a region on the right side).

The node addition menu 860 presents selectable icons 863 corresponding to nodes of particular functions (e.g., split, new output target, select fields for masking, add new blockchain type and source, encrypt fields, decrypt private transactions, deserialize, filter, for each, write, null sink, parse logs, and parse events) and may present additional and/or alternative icons or node functions in other implementations. A user may be able to drag and drop node options into their pipeline, or may be able to select a node and have the display manager 622 put the node in place as described above. The node addition menu 860 also includes interactive features to search 861 the available node options or filter 862 the available node options by type (e.g., search for any node that is implementing masking). As described in further detail below, the available node options presented in this node addition menu 860 may dynamically change based on automated analysis of nodes that are compatible with existing nodes specified in the processing pipeline 750. Though not illustrated, the node addition menu 860 may include selectable options to add additional data sources to the processing pipeline 750.

Figure 9:
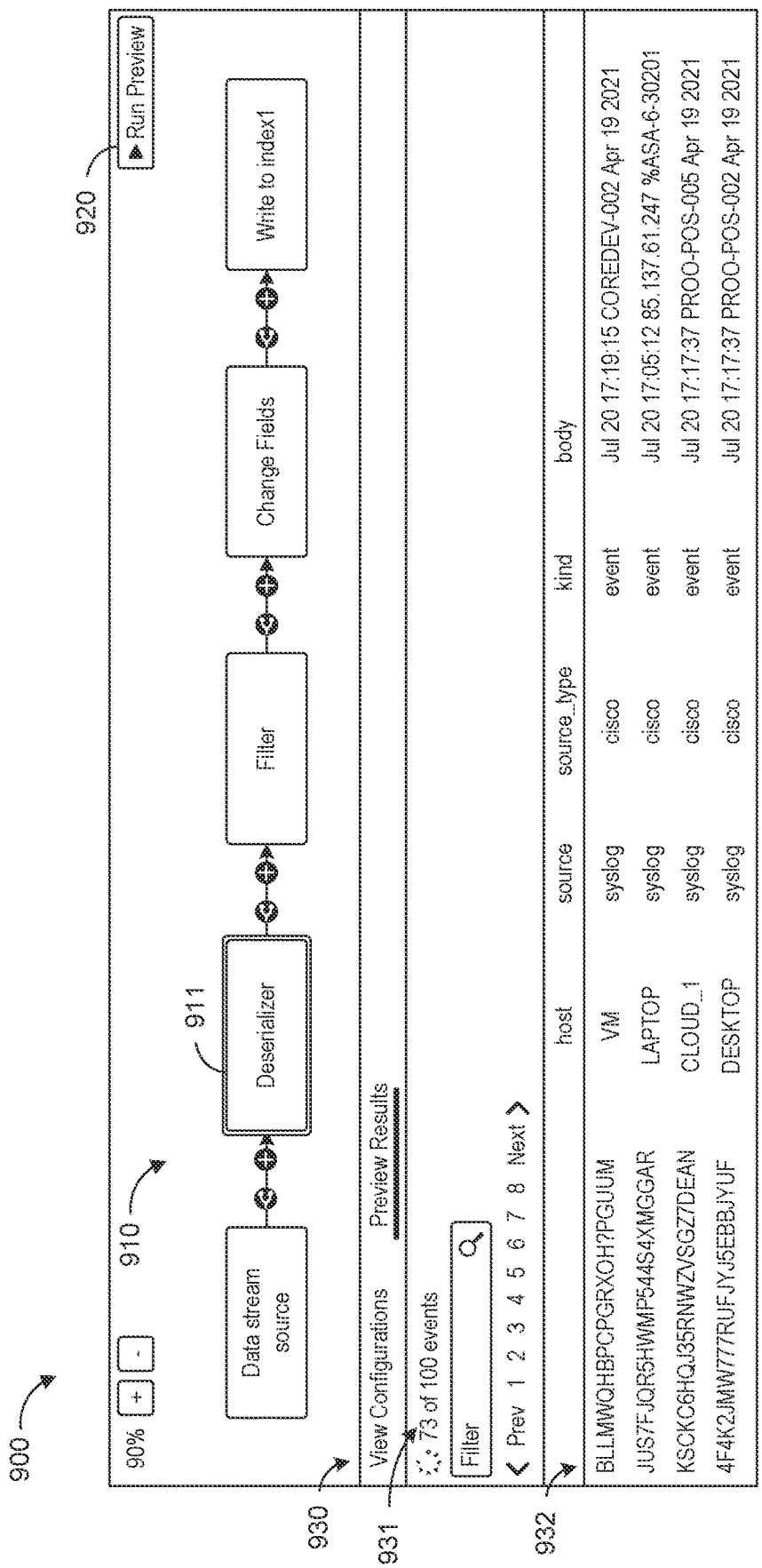
FIG. 9 is an interface diagram for previewing a data processing pipeline, according to some example embodiments.

FIG. 9 is an interface diagram of an example user interface 900 for previewing a data processing pipeline 910 being designed in the user interface, in accordance with example embodiments. The depicted example processing pipeline 910 corresponds to the first branch of the processing pipeline 650 described above, and can be created using the free-form canvas as discussed above (e.g., the canvas graphical user interface 700). In some implementations, the user interface 900 can include a selectable feature 920 that activates a preview mode that previews results of a canvas (upper region in the user interface 900) in a preview region 930. In other implementations, the preview mode can be activated each time the user specifies a new node or interconnection for the processing pipeline 910. Activation of the preview mode can implement the in-progress pipeline on the intake system 210 in a manner that captures real information about node processing behavior without fully deploying the pipeline for writing to the specified data destinations (here, index1).

In order to semi-deploy the processing pipeline in this manner, activation of the preview mode, as described in further detail below, can transform the AST of the pipeline by adding functions that capture the messages published by the various nodes and prevent writing data to any external databases. This allows the preview to operate on live data streamed from the source(s) without affecting downstream systems, so that the user can determine what the processing pipeline is doing to actual data that flows through the system.

The preview mode can update the user interface 900 with a preview region 930. Initially, the preview region. 930 may be populated with a visual representation of data streaming from the source(s). A user can select an individual node (here depicted as deserializing node 911) in the canvas to preview the data output by that node. The visual representation of that node may be changed (e.g., with a border, highlighting, or other visual indication) to show which node is being previewed in the current interface.

The preview region 930 can display a select number of events or messages output by the node 911, as specified by a limit function (described in further detail below). The depicted example shows 100 events, but this can be modified in various implementations to present a suitable amount of data for assessment by the user, without overwhelming the user with the entire data stream. The data output by node 911 is displayed in the example user interface in region 932, which here shows the original data stream followed by objects identified by deserialization (host device, data source, source type, data kind, and a body of the data). The region 932 can be populated with data captured by a preview function associated with the node 911, and can be updated as the user selects different nodes in the processing pipeline 910. The graphical interface can include selectable options to end the preview, or the user may end the preview by modifying or publishing the pipeline.

Although not illustrated in FIG. 9, the preview user interface 900 may also include interactive features (e.g., input fields, a slidable feature on a timeline) that enable the user to specify time periods for preview mode. Many of the preview examples described herein relate to preview of real-time data flowing through a draft processing pipeline. However, in some scenarios this may not be desirable, because as a user changes the pipeline they may want to see how these changes affect one set of data, because if the data shown in the preview interface is ever changing the user might have trouble locking in the processing flow. Thus, the preview user interface 900 may have features that enable a user to input a time window that specifies what messages of each source should be processed. The intake ingestion buffer might maintain messages for a set period (e.g., 24 hours), and for some implementations of the preview mode a user may "go back in time" to process messages rather than process streaming data. The preview user interface 900 may have features that allow the user to specify an end time to "replay" a stream of messages from the past.

For full deployment, a user might want to deploy their processing pipeline only for new (not yet processed) messages, or the user may also want to use the pipeline to process previous messages. For example, a user's current pipeline may have done something wrong. In order to fix it, the user can instruct the system to start again from 24 hours prior to recapture data that would otherwise be missed. In these instances, the older data may have already been processed using a previous pipeline. As such, the intake system 210 may tag data that is being reprocessed according to a new pipeline as potentially duplicative, such that a downstream system can understand that the data could be the same as data received based on a prior pipeline. The intake system 210 may tag the reprocessed data as authoritative, such that a downstream system can mark data from the same period but a different pipeline as deprecated.

Figure 10:
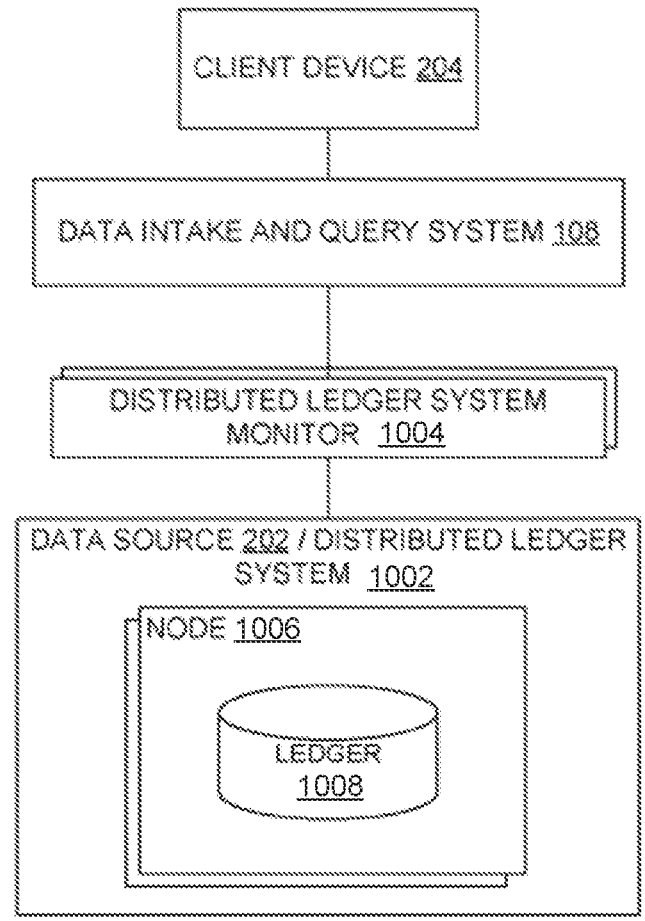
FIG. 10 is a block diagram illustrating a distributed ledger as a data source of a data intake and query system, according to some example embodiments.

FIG. 10 is a block diagram of an embodiment of the networked computer environment 100 described previously with reference to FIG. 1 that includes a distributed ledger system 1002 as a data source 202 of the data intake and query system 108, a distributed ledger system monitor 1004 (also referred to herein as monitor 1004), and a client device 204 to interact with data associated with the data intake and query system 108. Non-limiting examples of a distributed ledger system 1002 include, but are not limited to, Ethereum, Hyperledger Fabric, Quorum, Guardtime, KSI, etc.

The distributed ledger system monitor 1004 can be used to monitor or obtain data associated with the distributed ledger system 1002. The monitor 1004 can be implemented using one or more computing devices, virtual machines, containers, pods, another virtualization technology, or the like, in communication with one or more nodes 1006 of the distributed ledger system 1002. For example, in some embodiments, the monitor 1004 can be implemented on the same or across different computing devices as distinct container instances, with each container having access to a subset of the resources of a host computing device (e.g., a subset of the memory or processing time of the processors of the host computing device), but sharing a similar operating system. For example, the monitor 1004 can be implemented as one or more Docker containers, which are managed by an orchestration platform of an isolated execution environment system, such as Kubernetes.

Although illustrated as being distinct from the data intake and query system 108 and distributed ledger system 1002, it will be understood that in some embodiments, the monitor 1004 can be implemented as part; of the data intake and query system 108 and/or distributed ledger system 1002. For example, the monitor 1004 can be implemented using or on one or more nodes 1006 of the distributed ledger system 1002 and/or be implemented using one or more components of the data intake and query system 108. In certain embodiments, such as when the distributed ledger system 1002 is implemented using an isolated execution environment system, such as, but not limited to Kubernetes, Docker, etc., the monitor 1004 can be implemented as an isolated execution environment of the isolated execution environment system and/or using an isolated execution environment system that is separate from the isolated execution environment; system used to implement the distributed ledger system 1002.

In some embodiments, the monitor 1004 interfaces with the distributed ledger system 1002 to collect data from one or more components of the distributed ledger system 1002, such as the nodes 1006. In certain embodiments, the monitor 1004 can collect different types of data from the distributed ledger system 1002. In some embodiments, the monitor 1004 collects a particular type of data, such as transaction notification data.

Although only one monitor 1004 is shown in FIG. 10, it will be understood that multiple monitors can be used to collect data from the distributed ledger system 1002. In some embodiments, one or more monitors can collect data from each node 1006 (e.g., from each peer node 1006 and/or ordering node 1006) or a subset of the nodes 1006 (e.g., one or more peer nodes 1006).

As described herein, the nodes 1006 can generate different types of data. For example, a node 1006 can generate log data, metrics data, and/or transaction notification data.

In some embodiments, the log data can be generated in response to one or more activities on a node, such as an error, receipt of a request from another node 1006 or client computing device, or in response to the node 1006 processing a transaction of the distributed ledger system 1002. The log data can include information about the activity, such as an identification of the error, a transaction identifier corresponding to the transaction being processed and the nature of the processing task, etc. In some embodiments, the log data can correspond to or identify different transactions that are being processed by the nodes 1006. For example, the log data generated by a peer node 1006 (as will be described herein) can indicate the processing task being applied to a particular proposed transaction (e.g., receive transaction, endorse transaction, validate/invalidate transaction, commit block with transaction to blockchain, read/write the proposed changes of the transaction to the ledger state 1204). Similarly, an ordering node 1006 (as will be described herein) can generate log data indicative of activities it is executing relative to a transaction (e.g., receive endorsed transaction, order transaction, add transaction to a block, communicate transaction to peer nodes 1006 as part of the block, committing transaction to blockchain as part of a block).

Depending on the implementation of the nodes 1006, the log data can be stored in a data store of the nodes, and/or converted and stored as part of log data of an isolated execution environment system, etc. For example, if the nodes 1006 are implemented using one or more isolated execution environments, the log data may undergo processing by the isolated execution environment system and stored as part of a log file of the isolated execution environment system. For example, the log data may be wrapped in a JSON wrapper and stored as part of a Docker or Kubernetes log file, etc.

As described herein, the generated metrics can include information about the performance metrics of the node 1006 and/or the distributed ledger system 1002, such as, but not limited to, (1) CPU-related performance metrics; (2) disk-related performance metrics; (3) memory-related performance metrics; (4) network-related performance metrics; (5) energy-usage statistics; (6) data-traffic-related performance metrics; (7) overall system availability performance metrics; (8) cluster-related performance metrics; and (9) virtual machine performance statistics, etc. In some cases, the metrics are stored in a data store associated with a node 1006. In some cases, the metrics can include a timestamp corresponding to when the metric was measured/obtained.

The transaction notifications can include information about a block (including its transactions) that is to be committed to a blockchain. In some cases, the transaction notifications can correspond to individual transactions of a block, the entire block, or parts of a transaction, such as the chaincode used as part of a transaction, etc. In some cases, the transaction notifications can include the entire content of a block (e.g., the header portion, body portion, transactions, metadata,), or a summary of information, such as an indication of which transactions of a block were validated/invalidated and/or committed to a blockchain. In certain embodiments, the transaction notifications can be stored in a data store, a publication-subscription (pub-sub) messaging system, or buffer.

The transaction notifications can differ from the log data. For example, the log data can be generated asynchronously as various activities occur on different nodes 1006 (e.g., errors, specific processing tasks), whereas the transaction notifications can be generated as a result of a block being committed to a blockchain. For example, in some cases, peer nodes 1006 and/or ordering nodes 1006 can generate log data, but only peer nodes 1006 can generate transaction notifications. Further, the transaction notifications can differ from log data in that the log data can include unstructured raw machine data, whereas the transaction notifications can include structured data that identifies the block (or portions thereof) that is to be committed to a blockchain or a summary related to transactions of the block that is to be committed (e.g., identification of validated/invalidated transactions). In addition, the transaction notifications can include information about multiple transactions and/or multiple transaction identifiers, whereas the log data may include information about only one transaction and/or only one transaction identifier.

As mentioned, the monitor 1004 can collect any one or any combination of the data generated by the nodes 1006. In some embodiments, the monitor 1004 is configured to obtain one type of data, such as the transaction notifications. In some such embodiments, the monitor 1004 can interact with a respective node 1006 to obtain the transaction notifications. As described herein, in some cases, the transaction notifications are posted to a pub-sub. As such, the monitor can subscribe to the pub-sub to obtain the relevant transaction notifications. In some cases, a node 1006 is associated with multiple channels and the transaction notifications for the different channels are found on different topics of a pub-sub or on different pub-subs. In these cases, the monitor 1004 can be configured to subscribe to the different topics and/or pub-subs. In this way, the monitor 1004 can collect the relevant transaction notifications from a node 1006.

In some cases, the monitor 1004 processes the transaction notifications. For example, in some cases, portions of the transaction notification, such as the details of the individual transactions, may be encrypted or encoded. In these examples, the monitor 1004 can decode byte strings to readable UTF8 strings or hex. Further, the transaction notifications may include information about multiple transactions. In some such embodiments, the monitor 1004 may parse information about individual transactions and separately communicate the information about individual transactions to the data intake and query system 108 (as well as the entire transaction notification). In certain cases, each communication can include a transaction identifier that identifies the corresponding transaction. The data intake and query system 108 can store the separate communications as individual events. Accordingly, the monitor 1004 can be used to generate multiple events from one transaction notification. In some embodiments, the data intake and query system 108 can store the individual events generated from the transaction notifications in an index that is separate from an index that store metrics data and/or log data.

Furthermore, the monitor 1004 and/or data intake and query system 108 can extract the transaction identifiers from the communications received from the monitor 1004 using one or more regex rules. In some such embodiments, the data intake and query system 108 can store the transaction identifiers in one or more inverted indexes that associate the transaction identifier with the event that includes it. In some cases, the monitor 1004 can extract additional information from the transaction notifications, such as, but not limited to channel information (e.g., the channel associated with the transaction and/or blockchain), node information (e.g., identification of the nodes that endorsed, ordered, and/or validated the transaction), etc. The data intake and query system 108 can store any one or any combination of the extracted information in one or more inverted indexes.

In some example embodiments, the monitor 1004 includes instructions to identify whether the transactional data from the node 1006 is private transactional data (e.g., hashes) between two transacting nodes. In some example embodiments, if the transactional data is private and the transacting nodes are nodes that monitored by a monitor (e.g., by other monitors), then the monitor 1004 sends a further request to the node 1006 for pay log data of the transaction in decrypted form, which can be input into a pipeline system (e.g., pipeline system 1324) and sent to those transacting entities (e.g., sent to data storage devices of the transacting entities after further processing, such as host name or address making).

Figure 11:
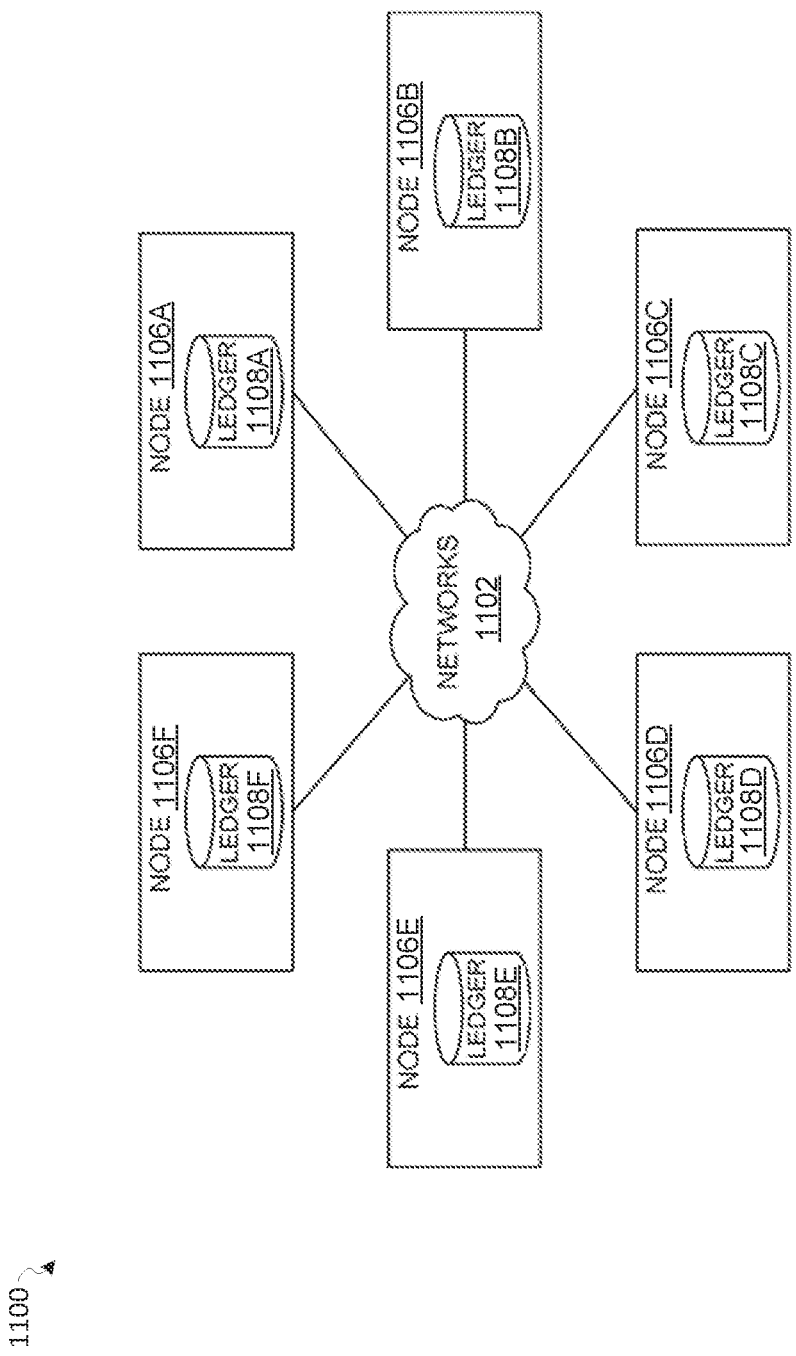
FIGS. 11 and 12 illustrate different types of blockchain architecture as data sources, according to some example embodiments.

FIG. 11 is a block diagram illustrating an example of a distributed ledger system 1100 that provides one or more distributed ledgers 1108A-1108F (generically referred to as ledger(s) 1108) or blockchains across one or more nodes 1106A-1106F (generically referred to as node(s) 1106). The nodes 1106 can communicate via a network 1102. The network 1102 can be the same as network 104 or a different public or private network. Each node 1106 can be implemented using individual computing devices, distributed processing systems, servers, isolated execution environments (e.g., containers, virtual machines), shared computing resources, and so on. In some embodiments, the nodes 1106 can be implemented on the same or as part of different isolated execution environment systems (e.g., as different containers or pods of the same or different Kubernetes cluster or Docker swarm).

In the illustrated embodiment of FIG. 11, each node 1106 is shown to include a ledger 1108 (which may include more than one ledger), which can be stored across one or more data stores, etc. In some embodiments, the ledger 1108 of each node 1106 can include one or more blockchains, etc. In some cases, the ledgers 1108 of the different nodes 1106 correspond to each other, include the same or matching data entries, or include the same data.

The distributed nodes 1106 can store, maintain and/or update their respective ledger 1108. Each node 1106 can be configured for storing a version of the distributed ledger 1108 (or a portion thereof), and the distributed ledger 1108 may be updated from time to time with modifications to the ledger 1108 and/or ledger entries, such as insertion of a ledger entry (also referred to herein as a block) or an update of a ledger entry. The distributed ledger system 1102 may be adapted such that, where issues arise with the distributed ledger 1108 (e.g., hash collisions, insertions at the same time, corrupted ledgers/ledger entries), the issues are resolved based at least on issue resolution logic. For example, such logic may be distributed among each of the nodes 1106 and/or their computing systems and can be used to improve or ensure consistency between copies of the ledgers 1108 at the different nodes. In some embodiments, issues may arise that can cause a distributed ledger 1108 to "fork" and/or spawn another instance, for example, where a collision cannot be automatically resolved between the nodes 1106. In such cases, the resolution logic can be used to determine when to "fork" or spawn another instance, etc.

It will be understood that each node 1106 can include fewer or more components. For example, each node 1106 can include processors, buffers, applications, databases, etc. In some cases, the nodes 1106 can include executable instructions or code that when executed by the node 1106 cause the node 1106 to modify a corresponding ledger 1108 or generate a transaction that is to be stored in a block of a blockchain In some cases, the executable instructions can be chaincode and can be used to implement or execute a smart contract relative to the ledger 1108.

As described herein, the nodes 1106 can include at least a decentralized set of computing devices and may even include personal computing devices for individuals, and so on. For example, a ledger 1108 may be stored on a large number of publicly available devices, each acting as a "node" for storing a copy of the ledger 1108 (e.g., being collaboratively maintained by anonymous peers on a network). In some embodiments, the ledger 1108 is only stored and maintained on a set of trusted. "nodes", such as on a private network or on the computing systems of authorized users. In some embodiments, a combination and/or a "mix" of both trusted nodes and public nodes may be utilized, with the same and/or different rules being applied to activities performed at each (e.g., a different validation process may be used for untrusted nodes, or simply untrusted nodes may be unable to perform certain activities). In some embodiments, there may be different levels of nodes with differing characteristics and applied logic.

The ledgers 1108, ledger entries, and/or information stored on the ledger entries may be used to store information received from one or more computing devices. For example, the information may include banking information, other commercial information, smart contracts, etc. Further, the ledger 1108 and ledger entries may utilize encryption technology to facilitate and/or validate digital signatures or the data received from the computing devices.

In some embodiments, the ledger 1108 is publicly accessible. In some embodiments, the ledger 1108 is only accessible to select, authorized nodes having the appropriate permissions. In some embodiments, portions of the ledger 1108 are public and portions of the ledger 1108 are private. When the ledger 1108 is publicly accessible, the ledger 1108 may be adapted to only store information incidental to a transaction or a document relating to a transaction, and may be adapted such that identifiable information is removed but validation information is maintained (e.g., storing a hash value computed from the underlying information). Further, the information stored on the ledger 1108 may be encrypted (non-limiting example: using a public key of a key pair associated with the data intake and query system 108), redacted, compressed, transformed. (e.g., through a one-way transformation or a reversible transformation), and so on.

Each of the one or more nodes 1106 may have, at various times, versions of the ledger 1108, and the ledger 1108 may be maintained through the propagation of entries and/or updates that may be copied across ledgers 1108. Ledger entries may contain elements of information (e.g., header information and/or other data). There may be various rules and/or logic involved in activities relating to the ledger entries (e.g., creating, updating, validating, deleting); for example, a majority, supermajority, or unanimous consent between nodes may be enforced as a condition to an activity relating to an entry. In some embodiments, distributed ledgers 1108 are utilized and the ledger entries are adapted to have various linkages to one another such that the integrity of the ledger entries can be reinforced and/or validated. For example, the linkages may include hashes computed based on prior entries in the ledger 1108, which may be utilized to determine whether a ledger entry is a fraudulent entry by reviewing the correctness of the hash based on performing the hash on information stored on prior entries.

The ledger 1108 may be maintained through, for example, a "distributed network system", the distributed network system providing decentralized control and storage of the ledger 1108 at the one or more nodes (which may be considered. "nodes" of the system). The number of "nodes" may be fixed or vary with time, and increasing or decreasing the number of "nodes" may impact the performance and/or security of the system.

The ledger 1108 copies stored and maintained at each "node" provide cross-validation with one another in the event of conflicts between ledgers 1108, and various cryptographic and/or hashing algorithms may be utilized during the generation, updating, deletion, linking, and so on, of ledger entries such that ledger entries have increased resiliency to unauthorized tampering or modification. For example, a blockchain ledger 1108 may be distributed across nodes 1106 and used to track information received from one or more computing devices. The blockchain ledger 1108 may have entries linked to one another using cryptographic records, and entries in the blockchain may be ordered, time stamped, and/or associated with metadata. These and other methods can be used for protection against "double" transfers and unauthorized modification of ledger entries.

Figure 12:
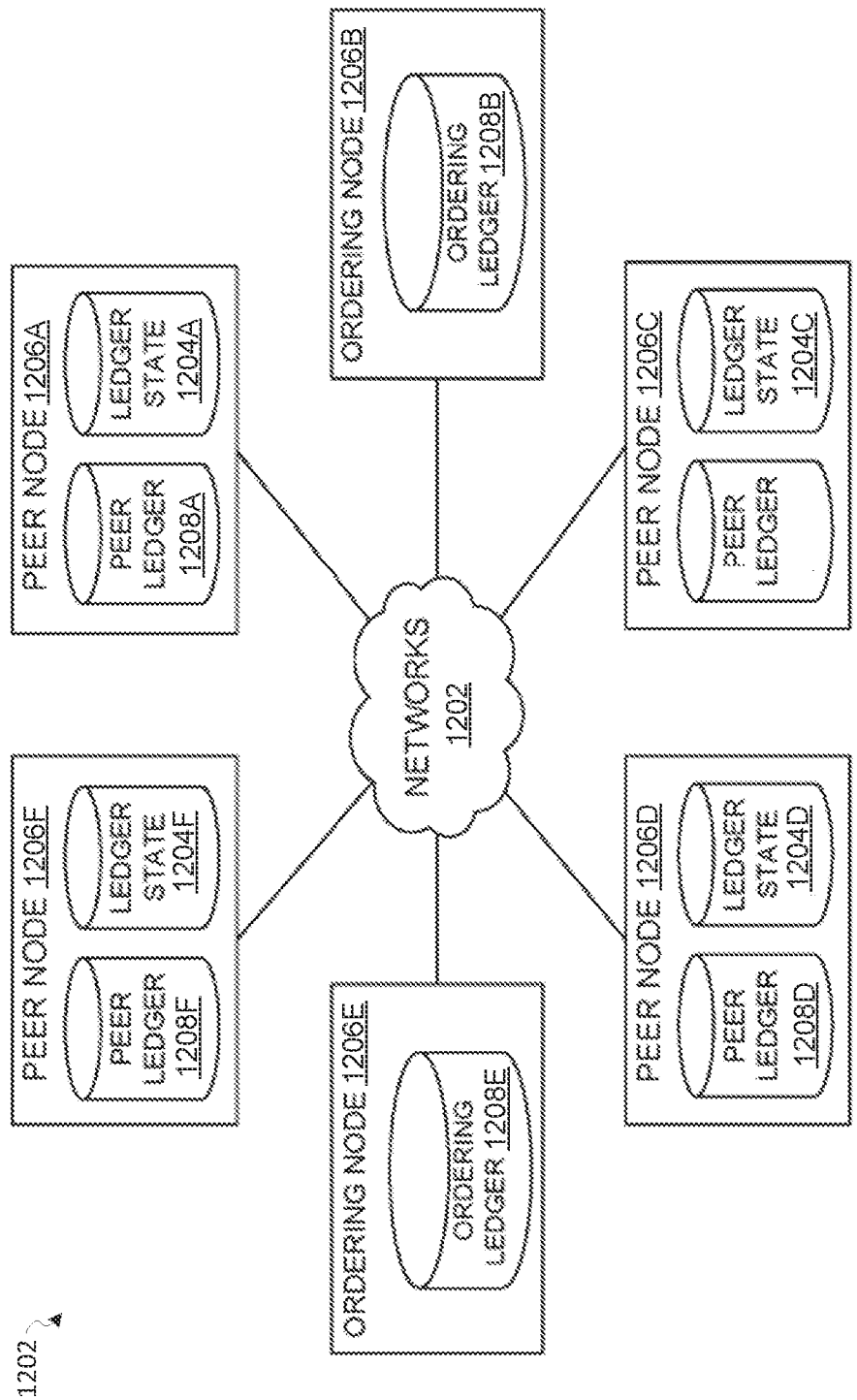

FIG. 12 is a block diagram illustrating another example of a distributed ledger system 1200 that includes different types of nodes 1206. Specifically, the illustrated example of FIG. 12 includes four peer nodes 1206A, 1206C, 1206D, 1206F (generically referred to as peer node(s) 1206) and two ordering nodes 1206B, 1206E (generically referred to as ordering node(s) 1206). It will be understood that fewer or more nodes can be included as desired. For example, the distributed ledger system 1200 can include only one ordering node 1206 or two or more ordering nodes 1206, Similarly, the distributed ledger system 1200 can include fewer or more peer nodes 1206 as desired.

As described herein, the peer nodes 1206 and ordering nodes 1206 can be implemented using one or more computing devices, isolated execution environments, etc. In some embodiments, each peer node 1206 and/or ordering node 1206 can be associated with the same or different organization, entity, or user. For example, one company may be associated with or control peer nodes 1206A, 1206C and ordering node 1206B, a second company may be associated with or control peer node 1206D and ordering node 1206E, and a third company may be associated with or control peer node 1206F. A non-limiting example of a distributed ledger system 1200 that includes peer nodes 1206 and ordering nodes 1206 is the Hyperledger Fabric.

For simplicity in describing FIG. 12, the peer nodes 1206 and ordering nodes 1206 are described with reference to a common channel that enables private communications/transactions between the illustrated nodes 1206A-1206F. However, it will be understood that the peer nodes 1206 and ordering nodes 1206 can be associated with multiple channels that each enable private communications/transactions between nodes associated with the channel and/or be associated with multiple consortiums made up of organizations that control the individual nodes 1206. Further, it will be understood that each peer node 1206 can include one or more peer node ledgers 1208 and/or ledger states 1204 and perform the functions described herein for each channel with which the peer node 1206 is associated. Similarly, each ordering node 1206 can include an ordering node ledger 1208 and perform the functions described herein for each channel with which the ordering node 1206 is associated. In some cases, each channel can include at least one ordering node 1206 and multiple peer nodes 1206. In certain embodiments, a channel is associated with multiple peer nodes 1206 and only one ordering node 1206. In certain cases, multiple ordering nodes 1206 can be associated with the same channel.

In the illustrated embodiment of FIG. 12, each of the peer nodes 1206A, 1206C, 1206D, 1206F includes a respective peer node ledger 1208A, 1208C, 1208D, 1208F (generically referred to as peer node ledger(s) 1208) and a respective ledger state 1204A, 1204C, 1204D, 1204F (generically referred to as ledger state(s) 1204), and can be used to receive proposed transactions from a client computing device (not shown), endorse transactions, communicate endorsed transactions to a client computing device or ordering node 1206, validate transactions of a block, commit blocks to a respective peer node ledger 1208, and/or update a respective ledger state 1204.

In some example embodiments, the peer node ledgers 1208 include one or more ledgers or blockchains. Further, the peer node ledgers 1208 of the different peer nodes 1206 can correspond to each other, include the same or matching entries, transactions, blocks, blockchains, etc. In some cases, the peer node ledger 1208 can include blocks formed from validated transactions, but may exclude invalidated transactions. In certain embodiments, the peer node ledgers 1208 can include blocks formed from validated and invalidated (or failed) transactions. In certain embodiments, such as embodiments in which an ordering node 1206 maintains an ordering node ledger 1208, the peer node ledgers 1208 can correspond to or match the ordering node ledgers 1208 of the ordering nodes 1206 and/or be different. For example, in some cases, the ordering node ledgers 1208 can include all endorsed transactions, regardless of whether they are validated, and the peer node ledgers 1208 can include endorsed and validated transactions but not endorsed and invalidated or failed transactions. In certain embodiments, the peer node ledgers 1208 can include one ledger or blockchain that matches the ordering node ledger 1208 and another ledger that does not match the ordering node ledger 1208.

In some cases, the peer node ledger 1208 is generated based on blocks received from an ordering node 1206. For example, the peer node 1206 can review the transactions of a received block and, if a transaction is validated, can include the transaction as part of a block for the peer node ledger 1208. Accordingly, in certain embodiments a block of a peer node 1206 may have fewer transactions (or none) compared to a corresponding block received from the ordering node 1206 and/or found in the ordering node ledger 1208

In some example embodiments, when a peer node ledger 1208 is implemented as a blockchain, each block of the blockchain can include a header portion (including metadata) and a body portion. The header portion and/or metadata can include a block number (e.g., which block the block is in the blockchain), one or more content identifiers for the current block, a content identifier for a previous block, one or more timestamps (e.g., when block was created, added to the blockchain), a digital certificate, a public key (of a public-private key pair), a digital signature of the peer node 1206 that added the block to the blockchain, and/or indicators as to whether a transaction of the block is valid/invalid, etc. In addition, in some cases, the header portion can include hashes or content identifiers for individual transactions of a block, etc., and the body portion of a block in the blockchain can include one or more transactions or transaction data associated with a transaction.

As described herein, in some cases, the transactions in a block of a peer node blockchain can include endorsed and validated transactions and/or may include validated and invalidated transactions. In certain embodiments, each transaction can include header information (e.g., chaincode used to generate the transaction, software version), digital signature of the client computing device that initiated the transaction, a signature or identifier of the endorsing peer nodes 1206 (peer nodes 1206 that signed and/or endorsed the transaction), channel information (which channel the transaction is associated with), a signature or identifier of the ordering node 1206 that ordered the transaction in the block, a proposed change to the peer node ledger 1208, an expected input/output of the transaction (e.g., the content of the ledger state 1204 before and after the transaction is executed), etc.

The ledger state 1204 can include one or more key-value pairs reflecting the value or state of the key (of the key-value pair), and can be implemented as a database in one or more data stores of a peer node 1206. In some embodiments, the ledger state 1204 reflects a current state or value of the keys based on the transactions in the corresponding peer node ledger 1208 or blockchain. As a non-limiting example, if the peer node ledger 1208 reflects transactions (e.g., debits and credits) associated with a particular bank account or other intangible object, the ledger state 1204 can reflect the current value of money in the bank account based on all previous transactions. As another non-limiting example, the ledger state 1204 can reflect a current ownership of a car or other physical object based on previous (validated) transactions associated with the car found in the peer node ledger 1208. Accordingly, as a peer node 1206 adds a block with one or more transactions to a peer node ledger 1208 or blockchain, the peer node 1206 can update the ledger state 1204 for keys that were altered based on any one or any combination of the (validated) transactions of the block. Similar to the peer node ledgers 1208, the ledger states 1204 of the different peer nodes 1206 can correspond to each other, include the same or matching key-value pairs, etc.

Although not illustrated, it will be understood that each peer node 1206 can include fewer or more components. For example, as mentioned, each peer node 1206 can include multiple peer node ledgers 1208, as well as chaincodes, permissions, etc. This information can be stored on one or more data store associated with the peer node 1206. The permissions can indicate which channels, organizations, or other components the peer node 1206 is associated with and/or what information the peer node 1206 is allowed to access or edit, etc.

The chaincodes can include executable instructions that the peer node 1206 is to execute and which can generate or be used to endorse or validate transactions for a block of a blockchain. For example, a chaincode can indicate that a peer node 1206 is to read/write information to a ledger state 1204. A client computing device (not shown) can cause the peer node 1206 to execute the chaincode by providing the peer node 1206 with one or more inputs. For example, if the chaincode is used to reflect the change in ownership of a car, the client computing device can identify the subject car and the identity of the parties involved in the transaction (e.g., buyer and seller). The peer node 1206 can use the chaincode to verify whether the ledger state 1204 includes the identified car and the parties are valid (e.g., identified owner owns the car and buyer is able to purchase the car), etc. Based on the chaincode, the relevant peer nodes 1206 can endorse or validate a transaction that is to be included as part of a block in a blockchain.

In the illustrated embodiment of FIG. 12, each of the ordering nodes 1206B, 1206E includes a respective ordering node ledger 1208B, 1208E (generically referred to as ordering node ledger(s) 1208), which can be used to order endorsed transactions received from peer nodes 1206, generate blocks from one or more transactions, communicate generated blocks to one or more peer nodes 1206, and update a respective ordering node ledger 1208. However, it be understood that in some embodiments, the ordering nodes 1206 do not include a ledger. In some such embodiments, the ordering nodes 1206 may only perform the ordering and block generation functions described herein.

The ordering node ledgers 1208 can include one or more ledgers or blockchains. Further, the ordering node ledgers 1208 of the different; ordering nodes 1206 can correspond to each other, include the same or matching entries, transactions, blocks, blockchains, etc. In certain embodiments, the ordering ledgers 1208 can include blocks formed from endorsed transactions (validated and/or invalidated or not yet validated/invalidated) transactions. In certain embodiments, the ordering node ledgers 1208 can correspond to or match a peer node ledger 1208 of a peer node 1206 and/or be different. For example, in some cases, the ordering node ledgers 1208 can include all endorsed transactions, regardless of whether they are validated, and the peer node ledgers 1208 can include endorsed and validated transactions but not invalidated or failed transactions. Further, in some cases, a transaction in a block of a peer node ledger can include a signature of a validating peer node, whereas a corresponding transaction in a block of an ordering node ledger 1208 may not include such a signature. In some cases, the ordering node does not validate the transactions of a block before posting the block to its blockchain or ordering node ledger 1208. Accordingly, the blocks of an ordering node blockchain can include transactions that later fail, are invalidated, or are determined to be invalid.

In some cases, the ordering nodes 1206 can be used to order transactions received from the peer nodes 1206. In certain cases, the ordering of transactions can reduce the likelihood of forks of a blockchain or the ledger state 1204 being different across peer nodes 1206, etc. In some embodiments, the ordering nodes 1206 can order the nodes based on a time of receipt and/or a timestamp associated with the transaction creation. In some cases, the ordering nodes 1206 can order the transactions chronologically. In addition to ordering transactions, an ordering node 1206 can generate a block that is to be appended to a blockchain. In some cases, as described herein, the ordering node 1206 can generate a block based on a predetermined amount of time, number of transactions, size of data, etc. Further, the order of the transactions in the generated block can correspond to the order generated by the ordering node 1206. Once the block is generated, the ordering node 1206 can communicate the generated block to one or more peer nodes 1206 for validation and commitment to a blockchain or peer node ledger 1208 and/or commit the generated block to an ordering node ledger 1208.

Figure 13:
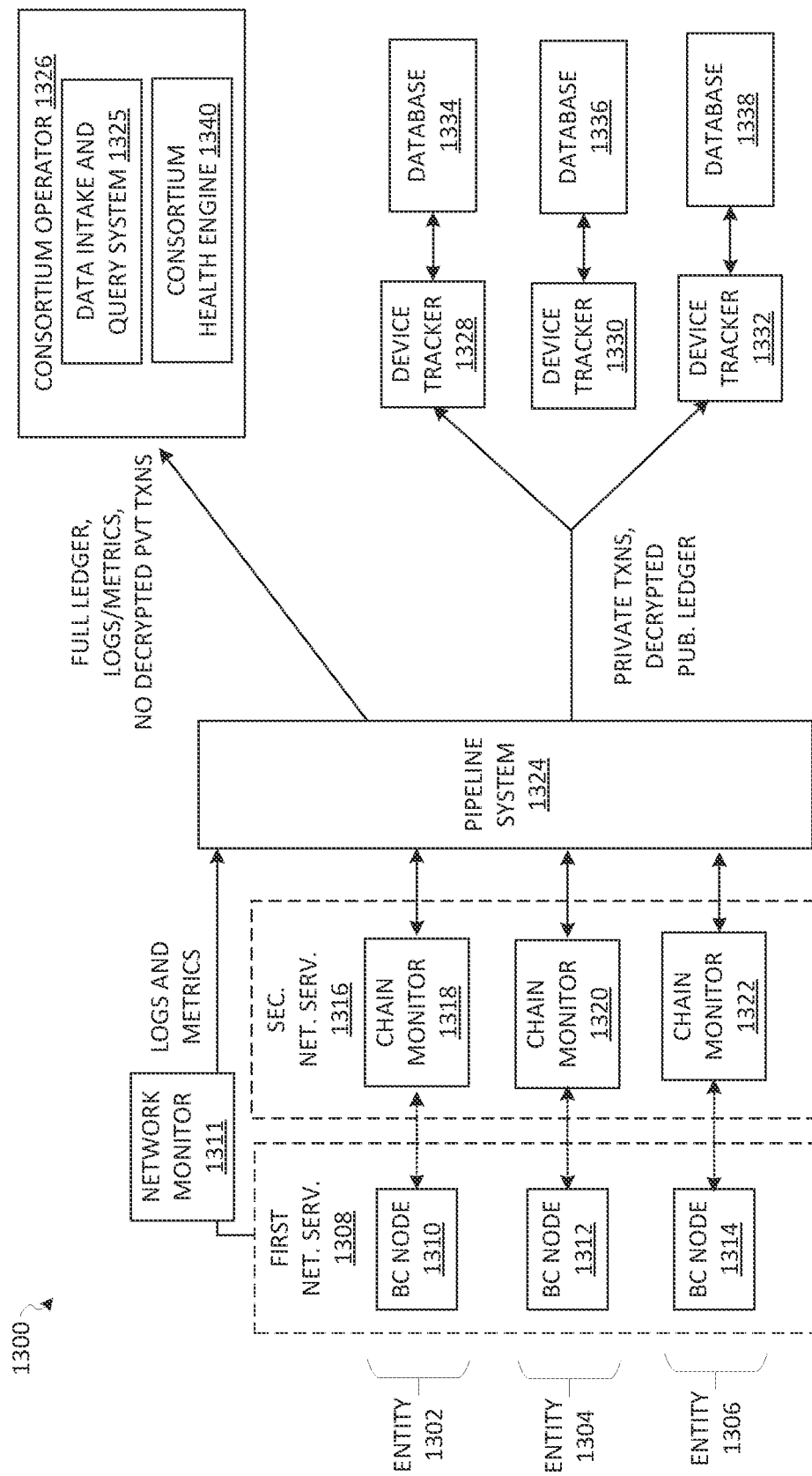
FIG. 13 shows a consortium blockchain architecture, according to some example embodiments.

FIG. 13 shows a consortium blockchain system 1300, according to some example embodiments. In the illustrated example, a first entity 1302, a second entity 1304, and a third entity 1306 are different organizations that transact with one another using one or more blockchain networks (e.g., a public immutable blockchain, such as Bitcoin or Ethereum, a private blockchain such as Hyperledger, or hybrid blockchain having private and public data, such as Quorum). A first network service 1308 (e.g., virtual cloud) comprises networked blockchain nodes, including a first blockchain node 1310 that is managed by the first entity 1302, a second blockchain node 1312 that is managed by second entity 1304, and a third blockchain node 1314 that is managed by the third entity 1306. For example, the first network service 1308 can include a virtual cloud. (e.g., Google Cloud, Microsoft Azure) that hosts devices (e.g., VMs) running each of the blockchain nodes 1310, 1312, 1314 for each of the entities 1302, 1304, and 1306. In some example embodiments, the blockchain nodes generate private and public data for a blockchain (e.g., Quorum nodes).

In some example embodiments, the first network service 1308 is a private blockchain (e.g., FIG. 12, Quorum, Hyperledger) in which the nodes are permissioned (e.g., approval is required to interact with the node network). Further, a second network service 1316 can include nodes that interact with the public chain (e.g., FIG. 11, Bitcoin, Ethereum) and can further include chain monitors (e.g., distributed ledger system monitor 1004) that are managed by the respective entities. According to some example embodiments, the different entities of FIG. 13 (e.g., entities 1302, 1304, and 1306) can transact with one another using the one or more blockchains, including a private blockchain to manage private interactions between nodes (e.g., transaction data, logistics data, user data), and payment can occur on a public blockchain such as the second network service 1316. For example, the nodes are hybrid nodes that are a fork. (e.g., Blockchain fork) of the second network service 1316 (e.g., Ethereum). For example, each of the blockchain nodes 1310, 1312, 1314 are Quorum nodes, which is a lightweight fork or modified version of an. Ethereum Geth client. In some example embodiments, each of the Quorum nodes is modified to implement a more lightweight consensus algorithm (e.g., instead of computationally intensive and slow Proof-of-Work, which is used to add blocks to the public chain). For example, the lightweight consensus algorithm can use RAFT-based consensus or Proof-of-Authority (PoA) based consensus for the private transactions. Further, a peer-to-peer layer between the nodes 1310, 1312, 1314 is modified to only allow connections to and from these permissioned nodes.

Further, in accordance with some example embodiments, the block validation logic of the nodes is modified to allow for private transactions (e.g., only shared amongst select nodes) as well as public transactions (e.g., broadcasted to the public chain, such as Ethereum). For example, the transaction creation instructions for the chain are modified in the fork for the nodes to allow for transaction data to be replaced by hashes of the encrypted payloads in order to preserve private data such as order data, payment data, identifying customer data (e.g., any information that can be used to identify customers, such as location data, login information, demographics, or customer payment data), etc. In accordance with some example embodiments, transactions implemented between the nodes 1310, 1312, and 1314 support public and private blockchain transactions. For example, public transactions for payment can be implemented using publicly observable transactions (e.g., completed via Proof-of-Work solving in Bitcoin, or payment of gas in Ethereum) as in the public version of the blockchain (e.g., Bitcoin, Ethereum), where the private transaction data is managed on the private blockchain between the permissioned nodes 1310, 1312, and 1314 via privacy manager instances operating in the respective nodes (e.g., Quorum privacy manager). In some example embodiments, the privacy manager encrypts private transaction data, which can be decrypted upon further requests (e.g., from a monitor 1004, or chain monitors 1318-1322), In some example embodiments, the first network service 1308 interfaces with a network monitor (e.g., Apache Kafka, Azure EventHub) to collect network-level and device-level operational logs and data for each of the nodes 1310-1314 (e.g., network address, disk usage, CPU and memory usage) and inputs the data into the pipeline system 1324.

Further illustrated in FIG. 13 is the second network service 1316 that has chain monitors 1318, 1320, and 1322 (e.g., monitor 1004), The chain monitors 1318-1322 are configured to receive information from corresponding nodes 1310, 1312, 1314 which can include public data (e.g., unencrypted public chain data) as well as private data (e.g., hashes of private transactions). As discussed above, the monitors 1004 can receive blockchain node data (e.g., information about the blockchain client application (e.g., Geth, Geth-fork) running on the node 1310), as well as transactional data generated from the node (e.g., private transactional data in hashed form, un-hashed public data).

Although three entities are illustrated in FIG. 13, it is appreciated that a multitude of nodes can be implementing nodes of the chain, and not all nodes have a corresponding chain monitor (e.g., some nodes may be third-party unknown nodes of a large organization or logistical business network). In some example embodiments, the chain monitors 1318 are configured to identify whether the data received is private transaction data (e.g., hashes) and further whether the transacting parties are participants in the blockchain consortium of the consortium blockchain system 1300. For example, the chain monitor 1318 receives private transactional data from node 1310 and further determines that the transacting node is node 1314 (e.g., by identifying a node ID of the node 1314), which is further monitored by chain monitor 1322. In some example embodiments, if the received data is for private transactions between monitored nodes, the chain monitor 1318 then initiates a request to generate pay log data from the node 1310 to be included and sent to the pipeline system 1324 (for splitting and forwarding). Likewise, the chain monitor 1322 receives private transaction data from node 1314 and requests unencrypted pay log data for the transaction and sends it to pipeline system 1324. In this way, the pipeline system 1324 processes three levels of data, including network-level data (e.g., logs and metrics of devices running the first network service 1308 (e.g., hosts running the nodes 1310-1314)), blockchain client data (e.g., from the chain monitors 1318-1322 describing operational data of the blockchain nodes running in the respective nodes 1310-1314), and unencrypted private transactional data (e.g., from the chain monitors 1318-1322 via requests for payment log data for private transactions between monitored nodes).

The pipeline system 1324 can include one or more components of a data processing pipeline of the data and intake system 1325 (e.g., data intake and query system 108, FIG. 1). For example, the pipeline system 1324 can include the intake system 210 (e.g., function repository 612, and processing pipeline repository 614) and the engines of the GUI pipeline creator 620, as discussed above with reference to FIG. 6. Although illustrated as external to the consortium operator 1326 in FIG. 13 for explanatory purposes, in some example embodiments the pipeline system 1324 is instantiated within the data intake and query system 1325 of the consortium operator 1326. In some example embodiments, the pipeline system 1324 receives network health data from a network monitor 1311, receives blockchain node health data and private transactional data from the chain monitors 1318, 1320, and 1322, and performs conditional processing operations (e.g., splitting, filtering, masking), and splitting into streams that enable the input blockchain data to be changed and output to different targets in different forms.

For example, the pipeline system 1324 can send all of the logs and metrics data from the first network service 1308 and the full transactions ledger (all transactions with private transaction hashed) to a consortium operator 1326 that is operating a data intake inquiry system 1325 to monitor the health and operational metrics of the consortium blockchain system 1300.

Further, the pipeline system 1324 identifies, splits, and routes the private (decrypted) transactional data to one or more data systems operated by the entities (e.g., first entity 1302, second entity 1304, third entity 1306). As an example, entity 1302 may initiate a transaction with entity 1306, and private transaction data with decrypted public ledger data (e.g., in decrypted form from node 1310 and node 1314, and recordation of the completed transactions as provided by chain monitor 1318 and chain monitor 1322), can be routed from the pipeline system 1324 and sent only to a device tracker 1328 that is managed by the first entity 1302 and a device tracker 1332 that is managed by the third entity 1306. In some example embodiments, the device trackers 1328, 1330, 1332 are data intake messaging devices (e.g., Apache Kafka, Azure EventHub) that are managed by the respective entities 1302, 1304, and 1306. In some example embodiments, each of the data intake devices receives data (e.g., from the pipeline system 1324, if involved in a given transaction) and stores the received data in databases 1334, 1336, and 1338 independently managed by the respective entities 1302, 1304, and 1306. Further, although in the example of FIG. 1.3 the entities 1302-1306 implement respective device trackers 1328-1332 and corresponding databases 1334-1338 to receive streams of data from the pipeline system 1324, in alternative example embodiments, the private transactional streams of data sent by the pipeline system 1324 are input into another target managed by the respective entities. For example, the device tracker and database systems of each of the entities can be replaced by an independent instance of the data intake and query system that is managed by the respective entities for efficient and easy searching and analysis of the private transactional data.

In some example embodiments, the consortium blockchain system 1300 is run from within a single virtual cloud (e.g., Google Virtual Cloud, Microsoft Cure), and each entity access the architecture uses entity sessions (e.g., subnets, network services of the single virtual cloud). In some example embodiments, the nodes of the entities and users are hosted on different devices and networked environments. For example, the first entity 1302 can host the first node 1310, the chain monitor 1318, device tracker 1328, and database 1334 on-premise (e.g., on local physical machines) and the second entity 1304 and third entity 1306 can run their corresponding modules on other local devices, or other virtual clouds.

Figure 14:
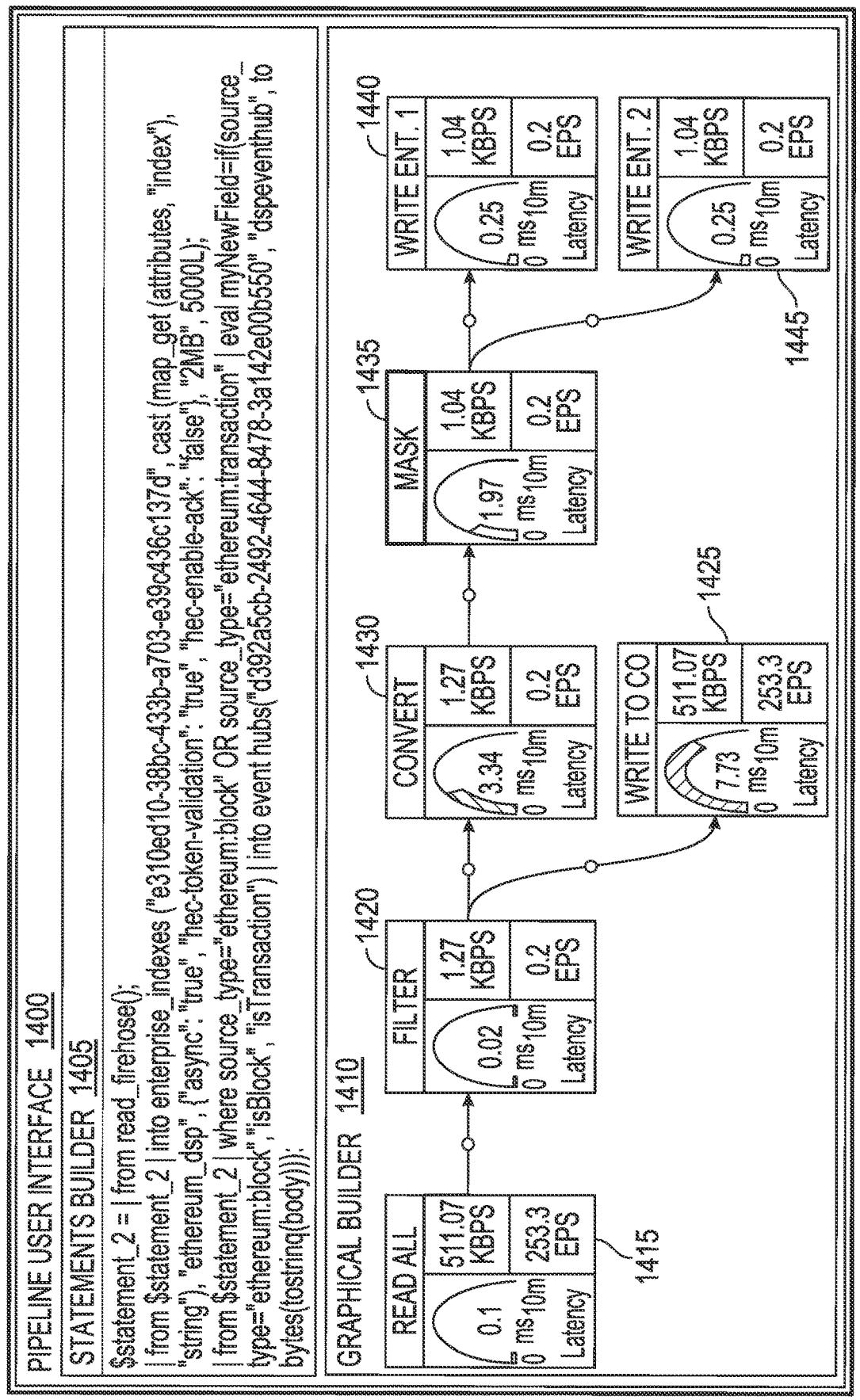
FIG. 14 shows an example pipeline user interface, according to some example embodiments.

FIG. 14 shows an example pipeline user interface 1400, according to some example embodiments. As illustrated, the pipeline user interface 1400 comprises a statement builder window 1405 and a graphical builder window 1410. In some example embodiments, the consortium operator builds the pipeline using graphical builder window 1410 which automatically generates code statements that are populated in the statements builder window 1405. For example, an end-user using the consortium operator account drags, drops, and connects one or more of the blocks in the graphical builder window 1410 to create a directed flow of operations, as discussed above with reference to FIGS. 7-9. In the illustrative example, the pipeline in the graphical builder window 1410 corresponds to the example transaction of FIG. 13, in which two entities are transacting using public blockchain network data (e.g., payment data) and private blockchain network data (e.g., private transactional data, note operational locking and metrics data).

The consortium source block 1415 is a data source input block in which all of the data received by the pipeline system 1324 is read and new data sources (e.g., new transacting entities/nodes, new blockchains, new device tracker) can be added by modifying the fields or code of the consortium source block 1415 (e.g., in the statements builder window 1405). The data from the consortium source block 1415 is then input to the filter block 1420. The filter block 1420 has conditional logic (e.g., for each, if/then) to filter private transactional data for private transactions between transacting nodes, and filter decrypted payment data for the private transactions and send the filtered data to the convert block 1430, and further send the remaining data (e.g., logs and metrics data, public ledger data with encrypted private transaction data) to the write block 1425 and the convert block 1430. For example, the filter block 1420 generates two streams of data and one of the streams is sent to the write block 1425 via a branching element (e.g., branching element 741). The write block 1425 writes the received data to a data store of the consortium operator (e.g.; a data intake and query system 1325). In some example embodiments, the data written to the consortium data store is further processed before sending to the consortium operator (e.g., further masking fields, further filtering, in accordance with the consortium participants).

In the illustrated example, the filtered data for the transacting nodes is then converted by the convert block 1430 to, for example, convert the host addresses of the transacting nodes to other addresses (e.g., publicly shared mapped network addresses). The converted data is then input into the masking block 1435 which can mask one or more fields. For example, the masking block 1435 can mask user information of customers of the transacting entities (e.g., mask location or any identifying information that identify end-users), The masked data is then split from the masking block 1435 to write blocks of the entities, including a write block. 1440 which writes a copy of the streamed data from the masking block 1435 to a target destination specified by the first entity 1302 (e.g., device tracker 1328), and further writes another copy of the streamed data from the block 1435 to another target destination 1445 as specified by the second entity 1406 (e.g., a data and intake query instance managed by the entity 1306, or device tracker 1332).

In the illustrated embodiment, the graphical builder 1410 may be generated from a functional and operating pipeline flow. As illustrated, and in accordance with some example embodiments, each node may display performance metrics, for example as a graphical representation displayed on the node or within the area of the node. The performance metrics, including number of events flowing in and out of the node, quantity of bytes flowing in and out of the node, and latency-related values (e.g., average latency), can be displayed on the node, and indicate any issues (e.g., whether a nodes process is slow, where one or more of the nodes is receiving data from a previous node).

Figure 15:
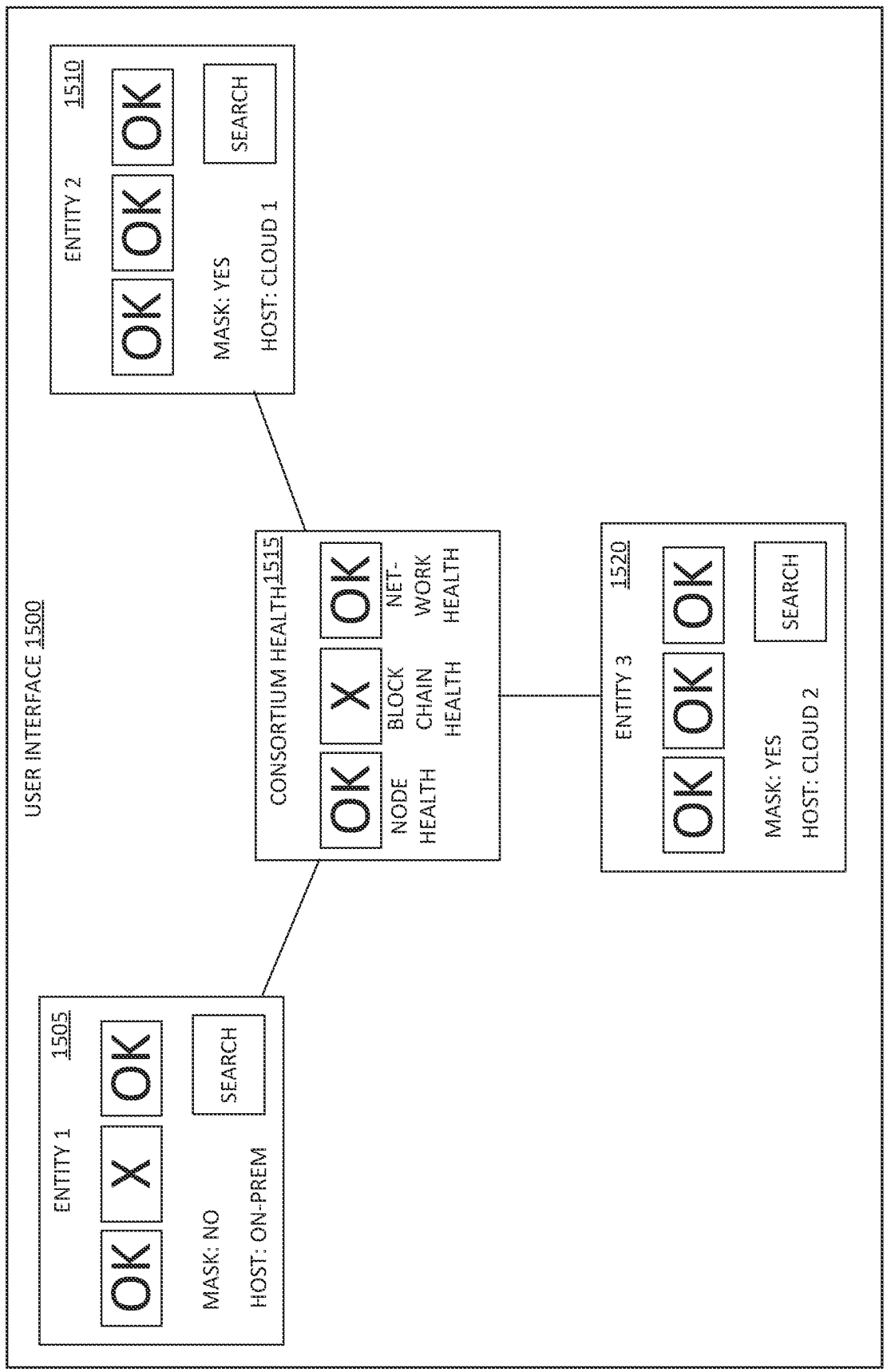
FIG. 15 shows an example consortium user interface, according to some example embodiments.

FIG. 15 shows an example consortium user interface 1500 displaying consortium visualizations, according to some example embodiments. The consortium user interface 1500 is generated by the consortium health engine 1340 based on the data received by the consortium operator 1326 (e.g., via write block 1425). In the illustrated example, the network health window 1515 displays consortium health data of the consortium participants. The entity_1 window 1505 displays status data for the first node 1302 which does not have masking implemented and is being run from on-premise local machines by one or more users of the first node 1302; entity_2 window 1510 displays status data for the second node 1304 which has masking implemented (e.g., masking data provided by the entity, such as network addresses) and is hosted from a virtual cloud. (e.g., Google Cloud) by one or more users of the second node 1304; and entity_3 window 1520 displays status data for the third node 1306 which has masking implemented and is hosted from a different virtual cloud (e.g., Microsoft Azure) by one or more users of the third node 1306, in accordance with some example embodiments.

As illustrated, the network health window 1515 shows indicators for node health (e.g., CPU, disk usage), blockchain health (e.g., blockchain transactional issues), and network health (e.g., node connectivity issues). In some example embodiments, the consortium health window 1515 displays an error (e.g., "X") if one or more of the entities incur an error. For example, if the first entity 1302 of entity_1 window 1505 sends a transaction to the third entity 1306 of the entity_3 window 1520 and an error occurs (e.g., transaction does not complete due to one or more issues), the consortium user interface 1500 can be implemented to identify which entity (or entities) caused the error; for example, by identifying the "X" in the entity_1 window 1505 of the first entity 1302. Further, consortium user interface 1500 can be implemented to identify the error type, for example by indicating that the error is not due to any network or node health issues (e.g., network connectivity, VM termination or overload) but rather is due to a blockchain health issue of first entity 1302.

In some example embodiments, to further analyze the issue, a user of the consortium user interface 1500 can select a search element on any of the entity windows to initiate the data intake and query system 1325 (e.g., of the consortium operator 1326) to display a search user interface, as illustrated in FIG. 16. The search user interface 1600 can be generated by the query system 214 and display blockchain-related data from the entity, to further search and identify the issue (e.g., entity_1 payment amount or balance is insufficient).

Alternatively, again with reference to FIG. 15, if there is an error in a transaction between two entities and the error is node health-related, (e.g., an "X" in the left most box of entity_1 window 1505) then the consortium operator can for example identify that the CPU level of the node is too high (e.g., from high volume of transactions), instead of blockchain health-related.

In some example embodiments, an error type is indicated but the consortium operator does not identify the problematic node. For example, and in accordance with some example embodiments, all nodes may have their host addresses masked for privacy reasons. The consortium user can identify an error, e.g., an "X" in the right most box in the consortium health window 1515, and can further identify that it corresponds to "Host 548", but does not identify which of the entities is running that host (e.g., each entity has a private mapping of host names). In these embodiments, the consortium operator can broadcast a message to all entities, that there is a network error with "Host 548" and each host can check their own mappings to determine whether the host is one their devices, and thus the source of the error (e.g., blockchain error, or device error).

Figure 17:
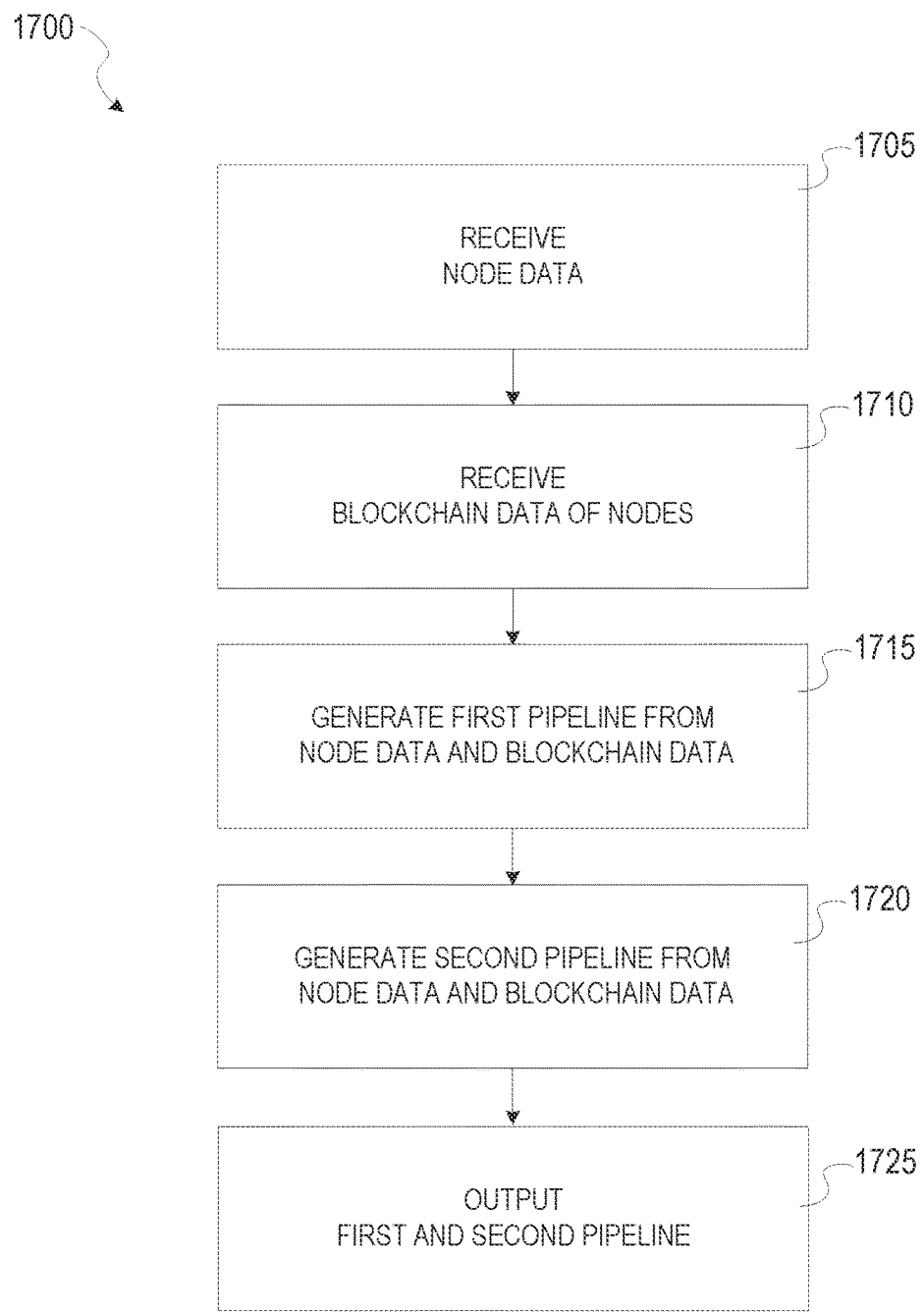
FIG. 17 shows a flow diagram of an example method for pipeline processing of a consortium blockchain architecture, according to some example embodiments.

FIG. 17 shows a flow diagram of an example method 1700 for pipeline processing of a consortium blockchain architecture, according to some example embodiments. At operation 1705, the pipeline system 1324 receives node data. For example, the pipeline system 1324 logs metrics data collected from devices running a plurality of blockchain nodes (e.g., VMs running nodes 1310, 1312, and 1314).

At operation 1710, the pipeline system 1324 receives blockchain data. For example, the pipeline system 1324 receives full ledger data that includes the public data and the private data in hashed form, and further receives decrypted transaction data for monitored and transacting consortium participants (e.g., node 1310, node 1314 in FIG. 13).

At operation 1715, the pipeline system. 1324 generates a first pipeline of data. For example, the pipeline system 1324 receives transaction data from the monitored and transacting consortium participants, and performs processing to modify the data (e.g., converting, masking), as discussed above.

At operation 1720, the pipeline system 1324 generates a second pipeline of data. For example, the pipeline system 1324 filters the data that is not included in the first pipeline in a second pipeline (e.g., that contains operational logs and metrics data and full ledger data with hashed private transactions). In some example embodiments, the pipeline system 1324 performs further operations (e.g., further masking, filtering, conversion) on the second pipeline of data).

At operation 1725, the pipeline system 1324 outputs the first and second pipelines. For example, the pipeline system 1324 outputs the first pipeline to one or more specified data stores, such as the device tracker 1328 of the first entity 1302 and the other device tracker 1332 of the third entity 1306. Further, the pipeline system 1324 outputs the second pipeline to a different data store, such as a data intake and query system 1325 of the a consortium operator 1326 for parsing and analysis by the consortium health engine 1340.

Figure 18:
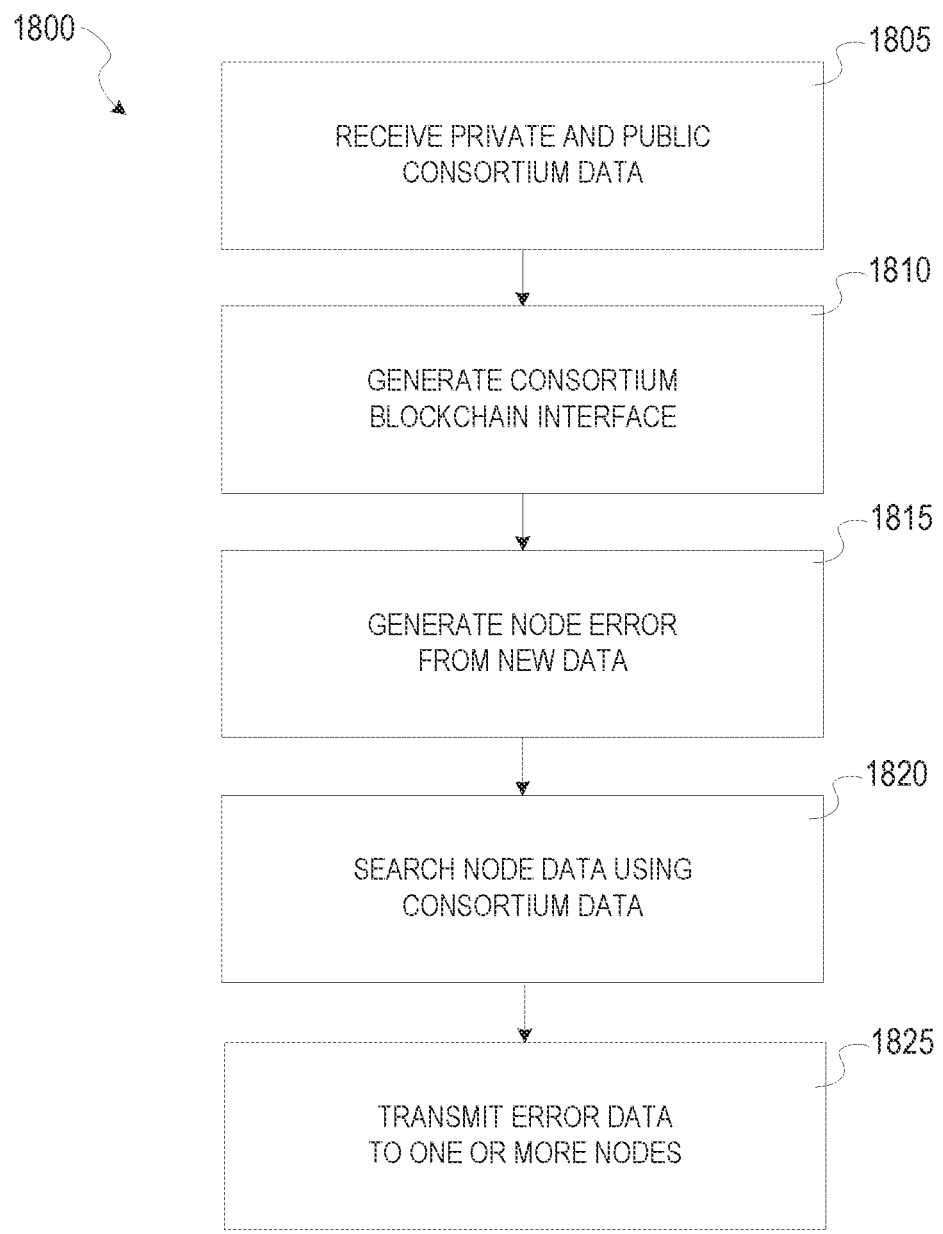
FIG. 18 shows a flow diagram of a method for managing errors in a consortium blockchain, according to some example embodiments.

FIG. 18 shows a flow diagram of a method 1800 for managing errors in a consortium blockchain, according to some example embodiments.

At operation 1805, the consortium operator 1326 receives the public and private consortium data. For example, the consortium operator 1326 receives the second pipeline of data that contains logs and metrics data for the consortium of nodes, and full ledger data.

At operation 1810, the consortium health engine 1340 generates a consortium user interface, such as the user interface 1500.

At operation 1815, the consortium health engine 1340 generates one or more node errors for one or more nodes of the network from the newly received data. For example, the latest data in the second pipeline can indicate that an error is occurring in one or more of the nodes.

At operation 1820, the data intake and query system 1325 of the consortium operator 1326 performs one or more searches on node data of the in-error nodes by using the data intake and query system 1325 on the second pipeline of data, as discussed above with reference to FIG. 16.

At operation 1825, the consortium operator 1326 transmits the error data to one or more of the nodes in the consortium. For example, if a blockchain client application of an identifiable node is malfunctioning, a blockchain status error message can be transmitted to the node (e.g., to a message or logging account of the node). In some example embodiments, the error data can be transmitted to a plurality of the nodes (e.g., a network status update to all nodes stating that "host 548" is malfunctioning where all host names and addresses are mapped and converted for privacy).

Figure 19:
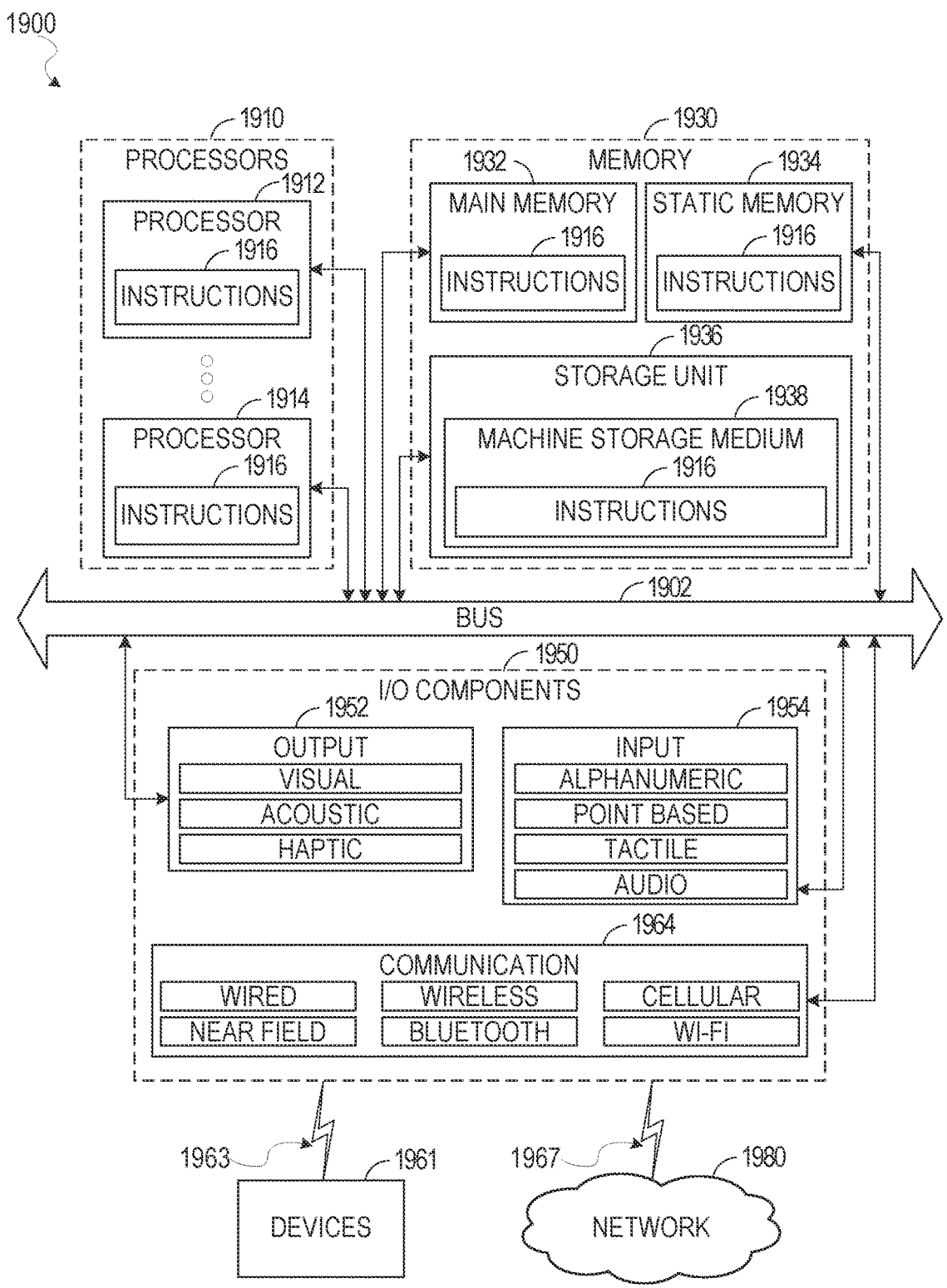
FIG. 19 illustrates a diagrammatic representation of a machine in the form of a computer system within which a set of instructions may be executed for causing the machine to perform any one or more of the methodologies discussed herein, in accordance with some embodiments of the present disclosure.

FIG. 19 illustrates a diagrammatic representation of a machine 1900 in the form of a computer system within which a set of instructions may be executed for causing the machine 1900 to perform any one or more of the methodologies discussed herein, according to an example embodiment. Specifically, FIG. 19 shows a diagrammatic representation of the machine 1900 in the example form of a computer system, within which instructions 1916 (e.g., software, a program, an application, an applet, an app, or other executable code) for causing the machine 1900 to perform any one or more of the methodologies discussed herein may be executed. For example, the instructions 1916 may cause the machine 1900 to execute any one or more operations of any of the dataflows and/or methods discussed above. In this way, the instructions 1916 transform a general, non-programmed machine into a particular machine 1900 that is specially configured to carry out any one of the described and illustrated functions in the manner described herein.

In alternative embodiments, the machine 1900 operates as a standalone device or may be coupled (e.g., networked) to other machines. In a networked deployment, the machine 1900 may operate in the capacity of a server machine or a client machine in a server-client network environment, or as a peer machine in a peer-to-peer (or distributed) network environment. The machine 1900 may comprise, but not be limited to, a server computer, a client computer, a personal computer (PC), a tablet computer, a laptop computer, a netbook, a smart phone, a mobile device, a network router, a network switch, a network bridge, or any machine capable of executing the instructions 1916, sequentially or otherwise, that specify actions to be taken by the machine 1900. Further, while only a single machine 1900 is illustrated, the term. "machine" shall also be taken to include a collection of machines 1900 that individually or jointly execute the instructions 1916 to perform any one or more of the methodologies discussed herein.

The machine 1900 includes processors 1910, memory 1930, and I/O components 1950 configured to communicate with each other such as via a bus 1902. In an example embodiment, the processors 1910 (e.g., a central processing unit (CPU), a reduced instruction set computing (RISC) processor, a complex instruction set computing (CISC) processor, a graphics processing unit (GPU), a digital signal processor (DSP), an application-specific integrated circuit (ASIC), a radio-frequency integrated circuit (RFIC), another processor, or any suitable combination thereof) may include, for example, a processor 1912 and a processor 1914 that may execute the instructions 1916. The term "processor" is intended to include multi-core processors 1910 that may comprise two or more independent processors (sometimes referred to as "cores") that may execute instructions 1916 contemporaneously. Although FIG. 19 shows multiple processors 1910, the machine 1900 may include a single processor with a single core, a single processor with multiple cores (e.g., a multi-core processor), multiple processors with a single core, multiple processors with multiple cores, or any combination thereof.

The memory 1930 may include a main memory 1932, a static memory 1934, and a storage unit 1936 comprising a machine storage medium 1938, all accessible to the processors 1910 such as via the bus 1902. The main memory 1932, the static memory 1934, and the storage unit 1936 store the instructions 1916 embodying any one or more of the methodologies or functions described herein. The instructions 1916 may also reside, completely or partially, within the main memory 1932, within the static memory 1934, within the storage unit 1936, within at least one of the processors 1910 (e.g., within the processor's cache memory), or any suitable combination thereof, during execution thereof by the machine 1900.

The I/O components 1950 include components to receive input, provide output, produce output, transmit information, exchange information, capture measurements, and so on. The specific I/O components 1950 that are included in a particular machine 1900 will depend on the type of machine. For example, portable machines such as mobile phones will likely include a touch input device or other such input mechanisms, while a headless server machine will likely not include such a touch input device. It will be appreciated that the I/O components 1950 may include many other components that are not shown in FIG. 19. The I/O components 1950 are grouped according to functionality merely for simplifying the following discussion and the grouping is in no way limiting. In various example embodiments, the I/O components 1950 may include output components 1952 and input components 1954. The output components 1952 may include visual components (e.g., a display such as a plasma display panel (PDP), a light emitting diode (LED) display, a liquid crystal display (LCD), a projector, or a cathode ray tube (CRT)), acoustic components (e.g., speakers), other signal generators, and so forth. The input components 1954 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

Communication may be implemented using a wide variety of technologies. The I/O components 1950 may include communication components 1964 operable to couple the machine 1900 to a network 1980 or devices 1961 via a coupling 1967 and a coupling 1963, respectively. For example, the communication components 1964 may include a network interface component or another suitable device to interface with the network. In further examples, the communication components 1964 may include wired communication components, wireless communication components, cellular communication components, and other communication components to provide communication via other modalities. The devices 1961 may be another machine or any of a wide variety of peripheral devices (e.g., a peripheral device coupled via a universal serial bus (USB)). For example, as noted above, the machine 1900 may correspond to any one of the client devices 102, host devices 106, network devices that implement networks 104 (e.g., routers), and the data intake and query system 108, in accordance with some example embodiments.

The various memories (e.g., 1930, 1932, 1934, and/or memory of the processor(s) 1910 anchor the storage unit 1936) may store one or more sets of instructions 1916 and data structures (e.g., software) embodying or utilized by any one or more of the methodologies or functions described herein. These instructions 1916, when executed by the processor(s) 1910, cause various operations to implement the disclosed embodiments.

As used herein, the terms "machine-storage medium," "device-storage medium," and "computer-storage medium" mean the same thing and may be used interchangeably in this disclosure. The terms refer to a single or multiple storage devices and/or media (e.g., a centralized or distributed database, and/or associated caches and servers) that store executable instructions and/or data. The terms shall accordingly be taken to include, but not be limited to, solid-state memories, and optical and magnetic media, including memory internal or external to processors. Specific examples of machine-storage media, computer-storage media, and/or device-storage media include non-volatile memory, including by way of example semiconductor memory devices, e.g., erasable programmable read-only memory (EPROM), electrically erasable programmable read-only memory (EEPROM), field-programmable gate arrays (FPGAs), and flash memory devices; magnetic disks such as internal hard disks and removable disks; magneto-optical disks; and CD-ROM and DVD-ROM disks. The terms "machine-storage media," "computer-storage media," and "device-storage media" specifically exclude carrier waves, modulated data signals, and other such media, at least some of which are covered under the term "signal medium" discussed below.

In various example embodiments, one or more portions of the network 1980 may be an ad hoc network, an intranet, an extranet, a virtual private network. (VPN), a local-area network (LAN), a wireless LAN (WLAN), a wide-area network (WAN), a wireless WAN OA WAN), a metropolitan-area network (MAN), the Internet, a portion of the Internet, a portion of the public switched telephone network (PSTN), a plain old telephone service (POTS) network, a cellular telephone network, a wireless network, a Wi-Fi® network, another type of network, or a combination of two or more such networks. For example, the network 1980 or a portion of the network 1980 may include a wireless or cellular network, and the coupling may be a Code Division Multiple Access (CDMA) connection, a Global System for Mobile communications (GSM) connection, or another type of cellular or wireless coupling. In this example, the coupling may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High-Speed Packet Access (HSPA), Worldwide Interoperability for Microwave Access (WiMAX), Long Term Evolution (LTE) standard, others defined by various standard-setting organizations, other long-range protocols, or other data transfer technology.

The instructions 1916 may be transmitted or received over the network 1980 using a transmission medium via a network interface device (e.g., a network interface component included in the communication components 1964) and utilizing any one of a number of well-known transfer protocols (e.g., HTTP). Similarly, the instructions 1916 may be transmitted or received using a transmission medium via a coupling (e.g., a peer-to-peer coupling) to the devices 1961. The terms "transmission medium" and "signal medium" mean the same thing and may be used interchangeably in this disclosure. The terms "transmission medium." and "signal medium" shall be taken to include any intangible medium that is capable of storing, encoding, or carrying the instructions 1916 for execution by the machine 1900, and include digital or analog communications signals or other intangible media to facilitate communication of such software. Hence, the terms "transmission medium" and "signal medium" shall be taken to include any form of modulated data signal, carrier wave, and so forth. The term "modulated data signal" means a signal that has one or more of its characteristics set or changed in such a manner as to encode information in the signal.

The terms "machine-readable medium," "computer-readable medium," and "device-readable medium" mean the same thing and may be used interchangeably in this disclosure. The terms are defined to include both machine-storage media and transmission media. Thus, the terms include both storage devices/media and carrier waves/modulated data signals.

The various operations of example methods described herein may be performed, at least partially, by one or more processors that are temporarily configured (e.g., by software) or permanently configured to perform the relevant operations. Similarly, the methods described herein may be at least partially processor-implemented. For example, at least some of the operations of the methods 1700 and 1800 may be performed by one or more processors. The performance of certain of the operations may be distributed among the one or more processors, not only residing within a single machine, but also deployed across a number of machines In some example embodiments, the processor or processors may be located in a single location (e.g., within a home environment, an office environment, or a server farm), while in other embodiments the processors may be distributed across a number of locations.

Although the embodiments of the present disclosure have been described with reference to specific example embodiments, it will be evident that various modifications and changes may be made to these embodiments without departing from the broader scope of the inventive subject matter. Accordingly, the specification and drawings are to be regarded in an illustrative rather than a restrictive sense. The accompanying drawings that form a part hereof show, by way of illustration, and not of limitation, specific embodiments in which the subject matter may be practiced. The embodiments illustrated are described in sufficient detail to enable those skilled in the art to practice the teachings disclosed herein. Other embodiments may be used and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent, to those of skill in the art, upon reviewing the above description.

In this document, the terms "a" or "an" are used, as is common in patent documents, to include one or more than one, independent of any other instances or usages of "at least, one" or "one or more." In this document, the term "or" is used to refer to a nonexclusive or, such that "A or B" includes "A but not B," "B but not. A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended; that is, a system, device, article, or process that includes elements in addition to those listed after such a term in a claim is still deemed to fall within the scope of that claim.

The following are example embodiments:

Example 1. A method comprising: receiving, by one or more processors, blockchain data generated by a plurality of nodes, a portion of the blockchain data comprising transaction data for a blockchain transaction between a first node and a second node of the plurality of nodes; splitting the blockchain data into a first stream and a second stream based on a preconfigured splitting parameter, the first stream comprising the portion of the blockchain data that includes the transaction data; routing the first stream to the first node and the second node, based on the first node and the second node being in the preconfigured splitting parameter; and routing the second stream to a data intake and query system.

Example 2. The method of example 1, further comprising: causing, on a display device of the data intake and query system, presentation of a user interface comprising visualizations indicating a status for each the plurality of nodes, the visualizations generated based on the second stream of the blockchain data.

Example 3. The method of any of examples 1 or 2, wherein the visualizations indicate a blockchain status and operational device status of each of the plurality of nodes.

Example 4. The method of any of examples 1-3, wherein the preconfigured splitting parameter specifies routing the first stream of the blockchain data to the first node and the second node based on the first node and the second node adding the transaction data to the blockchain data.

Example 5. The method of any of examples 1-4, wherein the blockchain data comprises block data from a blockchain and operational data from the plurality of nodes.

Example 6. The method of any of examples 1-5, wherein the first stream comprises the transaction data for transacting nodes including the first node and the second node, and the second stream comprises a masked version of the blockchain data that masks portions of data from the plurality of nodes.

Example 7. The method of any of examples 1-6, further comprising generating error data indicating an error in one or more of the transacting nodes that include the first node and the second node, the error identified using a masked version of the blockchain data in the second stream.

Example 8. The method of any of examples 1-7, wherein the operational data comprises machine data from operation of devices that host the plurality of nodes.

Example 9. The method of any of examples 1-8, wherein the error data corresponds to a device-based error that indicates a device that hosts one of the transacting nodes is malfunctioning.

Example 10. The method of any of examples 1-9, wherein the operational data comprises one or more network addresses of one or more of the plurality of nodes.

Example 11. The method of any of examples 1-10, wherein the operational data comprises at least one of: processor, disk, or memory usage of one or more of the plurality of nodes.

Example 12. The method of any of examples 1-11, further comprising: masking a portion of the operational data that corresponds to one of the transacting nodes.

Example 13. The method of any of examples 1-12, wherein the one of the transacting nodes receives error data from the data intake and query system and unmasks the portion of the operational data to identify a source of an error.

Example 14. The method of any of examples 1-13, wherein the first node is hosted on a first virtual private cloud, and wherein the second node is hosted on a second virtual private cloud that is different than the first virtual private cloud.

Example 15. The method of any of examples 1-14, wherein the first node is hosted on one or more on-premise hardware devices and the second node is hosted on a virtual private cloud.

Example 16. The method of any of examples 1-15, wherein the first node and the second node are hosted in different subnets of a virtual private cloud.

Example 17. A system comprising: one or more hardware processors; and a storage device storing instructions that configure the one or more hardware processors to perform operations comprising: receiving blockchain data generated by a plurality of nodes, a portion of the blockchain data comprising transaction data for a blockchain transaction between a first node and a second node of the plurality of nodes; splitting the blockchain data into a first stream and a second stream based on a preconfigured splitting parameter, the first stream comprising the portion of the blockchain data that includes the transaction data; routing the first stream to the first node and the second node, based on the first node and the second node being in the preconfigured splitting parameter; and routing the second stream to a data intake and query system.

Example 18. The system of any of example 18, the operations further comprising: causing, on a display device of the data intake and query system, presentation of a user interface comprising visualizations indicating a status for each the plurality of nodes, the visualizations generated based on the second stream of the blockchain data.

Example 19. The system of any of examples 17 or 18, wherein the visualizations indicate a blockchain status and operational device status of each of the plurality of nodes.

Example 20. A non-transitory machine-storage medium storing instructions that, when executed by one or more hardware processors of a machine, cause the machine to perform operations comprising: receiving blockchain data generated by a plurality of nodes, a portion of the blockchain data comprising transaction data for a blockchain transaction between a first node and a second node of the plurality of nodes; splitting the blockchain data into a first stream and a second stream based on a preconfigured splitting parameter, the first stream comprising the portion of the blockchain data that includes the transaction data; routing the first stream to the first node and the second node, based on the first node and the second node being in the preconfigured splitting parameter; and routing the second stream to a data intake and query system.

What is claimed is:

1. A method comprising:
   receiving, by one or more processors, blockchain data generated by a plurality of nodes, a portion of the blockchain data comprising transaction data for a blockchain transaction between a first node and a second node of the plurality of nodes;
   splitting the blockchain data into a first stream and a second stream based on a preconfigured splitting parameter, the first stream comprising the portion of the blockchain data that includes the transaction data;
   routing the first stream to the first node and the second node, based on the first node and the second node being in the preconfigured splitting parameter; and
   routing the second stream to a data intake and query system.

2. The method of claim 1, further comprising:
   causing, on a display device of the data intake and query system, presentation of a user interface comprising visualizations indicating a status for each the plurality of nodes, the visualizations generated based on the second stream of the blockchain data.

3. The method of claim 2, wherein the visualizations indicate a blockchain status and operational device status of each of the plurality of nodes.

4. The method of claim 1, wherein the preconfigured splitting parameter specifies routing the first stream of the blockchain data to the first node and the second node based on the first node and the second node adding the transaction data to the blockchain data.

5. The method of claim 1, wherein the blockchain data comprises block data from a blockchain and operational data from the plurality of nodes.

6. The method of claim 5, wherein the first stream comprises the transaction data for transacting nodes including the first node and the second node, and the second stream comprises a masked version of the blockchain data that masks one or more portions of data from the plurality of nodes.

7. The method of claim 6, further comprising generating error data indicating an error in one or more of the transacting nodes that include the first node and the second node, the error identified using a masked version of the blockchain data in the second stream.

8. The method of claim 7, wherein the operational data comprises machine data from operation of devices that host the plurality of nodes.

9. The method of claim 8, wherein the error data corresponds to a device-based error that indicates a device that hosts one of the transacting nodes is malfunctioning.

10. The method of claim 5, wherein the operational data comprises one or more network addresses of one or more of the plurality of nodes.

11. The method of claim 5, wherein the operational data comprises at least one of: processor, disk, or memory usage of one or more of the plurality of nodes.

12. The method of claim 5, further comprising:
    masking a portion of the operational data that corresponds to one of the transacting nodes.

13. The method of claim 12, wherein the one of the transacting nodes receives error data from the data intake and query system and unmasks the portion of the operational data to identify a source of an error.

14. The method of claim 1, wherein the first node is hosted on a first virtual private cloud, and wherein the second node is hosted on a second virtual private cloud that is different than the first virtual private cloud.

15. The method of claim 1, wherein the first node is hosted on one or more on-premise hardware devices and the second node is hosted on a virtual private cloud.

16. The method of claim 1, wherein the first node and the second node are hosted in different subnets of a virtual private cloud.

17. A system comprising:
    one or more hardware processors; and
    a storage device storing instructions that configure the one or more hardware processors to perform operations comprising:
        receiving blockchain data generated by a plurality of nodes, a portion of the blockchain data comprising transaction data for a blockchain transaction between a first node and a second node of the plurality of nodes;
        splitting the blockchain data into a first stream and a second stream based on a preconfigured splitting parameter, the first stream comprising the portion of the blockchain data that includes the transaction data;
        routing the first stream to the first node and the second node, based on the first node and the second node being in the preconfigured splitting parameter; and routing the second stream to a data intake and query system.

18. The system of claim 17, the operations further comprising:
causing, on a display device of the data intake and query system, presentation of a user interface comprising visualizations indicating a status for each the plurality of nodes, the visualizations generated based on the second stream of the blockchain data.

19. The system of claim 18, wherein the visualizations indicate a blockchain status and operational device status of each of the plurality of nodes.

20. A non-transitory machine-storage medium storing instructions that, when executed by one or more hardware processors of a machine, cause the machine to perform operations comprising:
receiving blockchain data generated by a plurality of nodes, a portion of the blockchain data comprising transaction data for a blockchain transaction between a first node and a second node of the plurality of nodes;
splitting the blockchain data into a first stream and a second stream based on a preconfigured splitting parameter, the first stream comprising the portion of the blockchain data that includes the transaction data;
routing the first stream to the first node and the second node, based on the first node and the second node being in the preconfigured splitting parameter; and
routing the second stream to a data intake and query system.

* * * * *